US010916151B2

United States Patent
Mulhall et al.

(10) Patent No.: US 10,916,151 B2
(45) Date of Patent: Feb. 9, 2021

(54) EN ROUTE PRODUCT DELIVERY BY UNMANNED AERIAL VEHICLES

(71) Applicant: MICROSOFT TECHNOLOGY LICENSING, LLC, Redmond, WA (US)

(72) Inventors: Alan Mulhall, Dublin (IE); Andreas Balzer, Dublin (IE); Muiris Woulfe, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/667,492

(22) Filed: Aug. 2, 2017

(65) Prior Publication Data

US 2019/0043370 A1  Feb. 7, 2019

(51) Int. Cl.
*G08G 5/00* (2006.01)
*B64C 39/02* (2006.01)
(Continued)

(52) U.S. Cl.
CPC ......... *G08G 5/0069* (2013.01); *B64C 39/024* (2013.01); *B64D 1/08* (2013.01); *B64F 1/32* (2013.01); *G01C 21/20* (2013.01); *G06Q 10/083* (2013.01); *G06Q 50/28* (2013.01); *G08G 5/006* (2013.01); *G08G 5/0013* (2013.01); *G08G 5/0026* (2013.01); *G08G 5/0034* (2013.01);
(Continued)

(58) Field of Classification Search
CPC ............ B64C 39/024; B64C 2201/128; B64C 2201/042; B64C 2201/027; B64C 2201/208; B64C 2201/024; B64C 2201/066
See application file for complete search history.

(56) References Cited

U.S. PATENT DOCUMENTS 9,536,216 B1  1/2017  Lisso
9,567,081 B1  2/2017  Beckman et al.
(Continued)

OTHER PUBLICATIONS

Mills, Chris, "Autonomous Drones Can Land on Moving Cars Now", http://gizmodo.com/autonomous-drones-can-land-on-moving-cars-now-1753961200, Published on: Jan. 20, 2016, 1 page.
(Continued)

*Primary Examiner* — Redhwan K Mawari
(74) *Attorney, Agent, or Firm* — Newport IP, LLC; Mike R. Cicero

(57) ABSTRACT

An unmanned aerial vehicle (UAV) rendezvous with and transfers a product to a receiving vehicle that is en route to a destination-location. The UAV is dispatched with the product along a flight path that intercepts with a predetermined route that the receiving vehicle is expected to travel along toward the destination-location. Once the UAV is within the vicinity of the receiving vehicle, the UAV approaches the receiving vehicle and utilizes cargo release equipment to transfer the product to the receiving vehicle. In one example, the UAV flies above the receiving vehicle at a synchronized velocity and drops the product through an opening in the roof of the receiving vehicle. In another example, the UAV flies above the receiving vehicle and suspends the product adjacent to a side-window opening of the receiving vehicle to enable an occupant of the receiving vehicle to reach out and retrieve the product.

20 Claims, 8 Drawing Sheets

(51) Int. Cl.
*G06Q 10/08* (2012.01)
*B64F 1/32* (2006.01)
*G06Q 50/28* (2012.01)
*B64D 1/08* (2006.01)
*G01C 21/20* (2006.01)
*G08G 5/04* (2006.01)

(52) U.S. Cl.
CPC ........ *B64C 2201/128* (2013.01); *G08G 5/045* (2013.01)

(56) References Cited

U.S. PATENT DOCUMENTS

| | | | |
|---|---|---|---|
| 9,580,173 B1* | 2/2017 | Burgess | B64D 1/22 |
| 9,676,481 B1* | 6/2017 | Buchmueller | B64D 1/02 |
| 9,849,981 B1* | 12/2017 | Burgess | G05D 1/0094 |
| 2016/0196756 A1* | 7/2016 | Prakash | G08G 5/025 |
| | | | 701/3 |
| 2016/0200438 A1* | 7/2016 | Bokeno | B60L 53/53 |
| | | | 244/2 |
| 2016/0257401 A1* | 9/2016 | Buchmueller | G01C 21/343 |
| 2016/0257423 A1* | 9/2016 | Martin | B64F 1/00 |
| 2017/0129603 A1* | 5/2017 | Raptopoulos | G05D 1/0676 |
| 2017/0147975 A1* | 5/2017 | Natarajan | B64F 1/00 |
| 2017/0247109 A1* | 8/2017 | Buchmueller | B64C 39/024 |
| 2017/0300855 A1* | 10/2017 | Lund | G06Q 30/0635 |
| 2017/0313421 A1* | 11/2017 | Gil | B64F 1/22 |
| 2019/0043370 A1* | 2/2019 | Mulhall | B64D 1/08 |

OTHER PUBLICATIONS

"Watch This Self-Flying Quadcopter Land on a Car Traveling at 50 Kilometers an Hour", https://www.technologyreview.com/s/602991/watch-this-self-flying-quadcopter-land-on-a-car-traveling-at-50-kilometers-an-hour/, Published on: Nov. 30, 2016, 5 pages.

Stevenson, Beth, "Google unveils UAV parcel delivery concept", https://www.flightglobal.com/news/articles/google-unveils-uav-parcel-delivery-concept-403160/, Published on: Aug. 29, 2014, 8 pages.

Burgess, Matt, "DHL's delivery drone can make drops quicker than a car", http://www.wired.co.uk/article/dhl-drone-delivery-germany, Published on: May 10, 2016, 3 pages.

Dreibus, Tony, "Workhorse Group Truck-Launched Drone Package Delivery System to Meet FAA Regs", https://www.trucks.com/2016/11/14/workhorse-q3-electric-truck-drone-delivery-system/, Published on: Nov. 14, 2016, 10 pages.

"Ford Targets Drone-To-Vehicle Technology to Improve Emergency Services, Commercial Business Efficiency", https://media.ford.com/content/fordmedia/fna/us/en/news/2016/01/05/ford-targets-drone-to-vehicle-technology.html, Published on: Jan. 5, 2016, 2 pages.

"Federal Automated Vehicles Policy", https://www.transportation.gov/AV, Published on: Sep. 2016, 116 pages.

* cited by examiner

EN ROUTE PRODUCT DELIVERY BY UNMANNED AERIAL VEHICLES

BACKGROUND

Companies have shown an interest in deploying unmanned aerial vehicles (UAVs) to deliver products. For example, to quickly and efficiently fulfill a consumer's online order, a company may attach a product to a UAV and convert a delivery address provided by the consumer to GPS coordinates. Once the UAV is loaded with the product and provided with the GPS coordinates, the UAV is dispatched to carry the product to the predetermined GPS coordinates where the UAV lands, releases the product, and then takes off again to return to a fulfillment center of the company.

Unfortunately, conventional UAV delivery services provide little or no benefit when time is of the essence and a consumer desires a product while their current location is dynamic such that delivery cannot be performed to a static delivery address. For example, in a scenario where a consumer desires a product while traveling between two locations, currently, the consumer must typically deviate from his or her route and travel to a source of the needed product prior to continuing on to a destination. For example, a busy professional's only opportunity to eat lunch may occur between meetings while the professional is traveling across town from one meeting to another. To mitigate the risk of being late to his or her next meeting, the busy professional may decide against deviating to a restaurant and go directly to the location of the next meeting without lunch.

Without the ability to obtain a product at a dynamic delivery location while traveling between locations, people typically are forced to choose between the inconvenience of traveling physically going to a source for the product or continuing directly to their destination without obtaining the product. It is with respect to these and other considerations that the disclosure made herein is presented.

SUMMARY

This disclosure describes systems and techniques that facilitate a product being delivered by an unmanned aerial vehicle (UAV) to a receiving vehicle that is en route to a destination-location. Generally described, the UAV is dispatched to carry the product along a flight path that converges with a land route on which the receiving vehicle is traveling towards the destination-location. The flight path of the UAV may be dynamically updated based on receiving information as to real-time locations of the receiving vehicle. For example, as the receiving vehicle progresses towards a destination-location, the UAV may dynamically alter its flight path to optimize delivery efficiencies (e.g., in terms of delivery time and/or energy usage). Once the UAV is within the vicinity of the receiving vehicle, the UAV may approach the receiving vehicle from overhead to transfer the product to the receiving vehicle. The disclosed systems and techniques thus eliminate or mitigate the need for people with restricted schedules to choose between the first inconvenient option of diverting from their route to pick up the product at a source-location, or the second inconvenient option of going without the product and continuing on to the destination-location. Accordingly, the disclosed systems and techniques represent a substantial advance over conventional UAV delivery services.

In an illustrative implementation, a system receives order data that indicates a selection of a product for delivery to a receiving vehicle that is operating on a roadway system. The order fulfillment data may be generated by a computing device such as, for example, an onboard computing system that is integrated into the receiving vehicle (e.g., an in-dash navigation system) and/or a hand-held computing device of a consumer (e.g., a smartphone). Additionally or alternatively, the order fulfillment data may be manually entered into a computing device by a service operator that receives order data over the phone from consumers (e.g., a consumer can place an order over the phone with a restaurant that then manually enters some of the order data into the computing device).

The system may determine anticipated travel data that indicates a travel-schedule that the receiving vehicle is expected to travel along a predetermined route (e.g., to navigate to a destination-location). The predetermined route may be defined based on a roadway system that the receiving vehicle is presumed to be constrained to (e.g., it may be presumed that a typical route of a car or other road-based vehicle will not include "off-road" travel). The predetermined route may also be defined based on a course that is plotted onto a nautical and/or aeronautical navigation chart (e.g., a boat may travel a substantially constant cardinal direction between two locations). The travel-schedule may indicate a specific time at which the receiving vehicle is expected to depart from an initial-location toward the destination-location, a specific time at which the receiving vehicle is expected to reach one or more points along the predetermined route, a specific time at which the receiving vehicle is expected to arrive at the destination-location, and/or any other temporal information that may be usable to determine when and where the UAV may be able to efficiently rendezvous with the receiving vehicle to deliver the product. In some configurations, as will be explained in more detail below, the system can also select a source of the product depending on the predetermined route of the receiving vehicle, the location of a projected rendezvous area (e.g., where the UAV is projected to approach and deliver the product to the receiving vehicle), and other factors such as the availability of product, etc.

In response to receiving the order data, the system generates route data that at least partially defines a flight path for the UAV to fly with the product and, ultimately, to rendezvous with the receiving vehicle while the receiving vehicle is en route to the destination-location. The route data may in some instances indicate a flight-schedule that defines a rendezvous area along a portion of the predetermined route. Stated alternatively, in conjunction with the travel-schedule that indicates when the receiving vehicle is expected to be at one or more predetermined locations along the predetermined route, the flight-schedule may be designed to control when and where the UAV will rendezvous with the receiving vehicle.

For illustrative purposes, consider a scenario where a consumer places an order for a product while traveling along a predetermined route that will eventually pass relatively close to a fulfillment center from which a UAV may be dispatched with the product. For example, the consumer may place the order while one-hundred miles away from the fulfillment center but while driving towards the fulfillment center on an interstate highway that passes within one-half mile from the fulfillment center. Under these circumstances, the flight-schedule may be designed to optimize delivery efficiencies in terms of energy usage (e.g., minimizing energy consumed by the UAV to deliver the product) by delaying a dispatch time for the UAV so that the rendezvous with the receiving vehicle occurs where the predetermined route is closest to the fulfillment center (e.g., so that the UAV travels only one mile round-trip to deliver the product). Alternatively, the flight-schedule may be designed to optimize delivery efficiency in terms of delivery time (e.g., minimizing a time until the UAV delivers the product) by immediately dispatching the UAV so that the rendezvous with the receiving vehicle occurs as soon as possible, although this causes the UAV to travel farther from the fulfillment center.

In some implementations, the system may be configured to obtain location data associated with the receiving vehicle wherein the location data indicates one or more substantially real-time locations of the receiving vehicle. The system may utilize the location data to dynamically update the route data to define an updated flight path for the UAV to travel to rendezvous with the receiving vehicle. In some implementations, the system may generate projected location data that indicates one or more expected future locations of the receiving vehicle and/or specific times at which the receiving vehicle is expected to arrive at the one or more expected future locations. For example, continuing with the previous scenario, the system may obtain location data that indicates real-time locations of the receiving vehicle as the receiving vehicle is driving along the interstate highway approaching the fulfillment center on its way to the destination-location. Based on the real-time locations, the system may determine a rate (e.g., in terms of miles per hour) at which the receiving vehicle is progressing along the predetermined route. Then, based on the determined rate, the system may continually improve an accuracy of the receiving vehicle's projected arrival at the portion of the predetermined route that is closest to the fulfillment center. In some implementations, the system may cause the UAV to perform one or more energy conserving maneuvers based on the dynamic location data associated with the receiving vehicle. As a specific but nonlimiting example, the rate at which the receiving vehicle progresses along a predetermined route may steeply fall (e.g., due to an unforeseen condition such as a vehicular accident blocking the interstate highway) while the UAV is en route to the rendezvous area. In this example, the system may cause the UAV to continue to the rendezvous area and then land to conserve energy while waiting for the receiving vehicle to arrive at the rendezvous area.

Once the UAV and the receiving vehicle are within the vicinity of one another (e.g., once both vehicles are within the rendezvous area), the system may cause the UAV to approach the receiving vehicle to achieve a predetermined alignment between the product (e.g., that is releasably coupled to the UAV) and an opening into the receiving vehicle. For example, the system may cause the UAV to hover above the receiving vehicle while the receiving vehicle is traveling along the interstate highway. Thus, both the velocity and direction of the UAV can be controlled to adjust an alignment between the product and an opening into an interior region of the receiving vehicle until the predetermined alignment is reached. The UAV may then closely monitor and/or synchronize a velocity and/or side-to-side steering movements of the receiving vehicle in order to safely maintain the predetermined alignment while hovering above the receiving vehicle. In some implementations, once the UAV has achieved the predetermined alignment and is at a distance above the receiving vehicle that is close enough to transfer the product without negatively impacting safety and/or causing property damage, the UAV may release and/or lower the product to cause the product to pass through an opening into an interior region of the receiving vehicle. As a more specific but nonlimiting example, the UAV may be caused to fly at a predetermined height above the receiving vehicle and to achieve a predetermined alignment of the product with respect to a sunroof of the receiving vehicle. Then, the UAV may deliver the product by releasing the product to cause the product to fall through the open sunroof into the receiving vehicle. As another specific but nonlimiting example, the UAV may be caused to fly above the receiving vehicle and also to lower the product on a tether towards the opening of the receiving vehicle to facilitate a transfer of the product through the opening. For example, the UAV may deploy the tether to lower the product through a sunroof of the receiving vehicle and/or suspend the product adjacent to a side window of the receiving vehicle. Then, once the product has passed through the opening (e.g., the sunroof and/or the side window opening), the UAV may release the product, retract the tether, and return to the fulfillment center.

In some implementations, the system may cause the UAV to select a particular opening of the receiving vehicle in which to deliver the product based on one or more factors such as local vehicular laws and regulations (e.g., whether it is legal in a specific state to drop products within or on a receiving vehicle), where an occupant (e.g., a driver of the receiving vehicle or a non-driving passenger) is seated within the receiving vehicle, whether the receiving vehicle is being driven autonomously by an autopilot module or manually driven by a human driver, and/or traffic conditions. In one specific but non-limiting example, the UAV may be configured with instructions to deliver the product through an open sunroof of the receiving vehicle while the receiving vehicle is in motion if, and only if, the receiving vehicle is being autonomously driven such that any distraction that is caused by the delivery to an occupant will not impact safety. Accordingly, it can be appreciated that depending on a variety of factors, the system may select an individual one of a plurality of transfer protocols for transferring the product through the opening into the receiving vehicle. In some implementations, the system may be configured to select from only "stationary" protocols (i.e., during which the receiving vehicle is completely stopped while the product is transferred) based on analysis of a current autonomy level of the receiving vehicle that indicates a degree of control that an autopilot module (if the receiving vehicle is so equipped) currently exhibits over movements of the receiving vehicle. For example, the system may cause the UAV to recognize when the receiving vehicle is under human control and may withhold delivery of the product until the driver brings the receiving vehicle to a complete stop, puts the receiving vehicle in park, or even turns the receiving vehicle off. In some implementations, the system can determine where people are seated in the receiving vehicle. Such a determination can be done through a camera (e.g., an in-car camera, a toll plaza camera, etc.) with visual recognition or it could be specified during the ordering process. Additionally or alternatively, a determination of where people are seated in the vehicle can be done through weight sensors. For example, many modern vehicles include weight sensors to detect whether an occupant is present in the driver seat and front passenger seat to control whether an airbag is deployed on each side in the event of a crash. Accordingly, in some instances, the receiving vehicle may communicate with the UAV to inform the UAV as to which seats are currently occupied. An occupant of the receiving vehicle can also generate data via a computer to communicate a seating position of the occupants. The camera can be in the receiving vehicle or the UAV. Image data from the camera can be communicated to the system and the image data can be used to determine a side, opening, or area of the receiving vehicle most suitable for delivery.

In some implementations, the receiving vehicle may be identified (e.g., by the system and/or the UAV) based on a vehicle identifier, another characteristic of the receiving vehicle, and/or the client computing device corresponding to the order data. For example, the UAV may be configured with one or more computer vision systems (e.g., stereo vision, thermal cameras, and/or IR cameras) and/or other environmental obstacle sensing systems (e.g., LIDAR systems, RADAR systems, and/or other time-of-flight systems) that enable the UAV to identify the receiving vehicle by a vehicle identifier (e.g., license plate number) or any other visible characteristic (including characteristics that are invisible to humans but visible to machines such as infrared-paint markings). Additionally or alternatively, the UAV may be configured to receive data signals from a client computing device that was used to order the product. Based on these data signals, the UAV may identify the receiving vehicle as the particular vehicle (e.g., of numerous vehicles on a public roadway system) which is currently carrying the client computing device. For example, a consumer may use a smart phone to order the product via an online retailer's mobile application (or alternatively the user can "call in" the order using a phone-based ordering service). Then, the UAV may enter the predefined rendezvous area while the receiving vehicle is also within the rendezvous area and may communicate with the smart phone to determine which vehicle within the rendezvous area is the receiving vehicle.

As used herein, a vehicle identifier (also referred to herein as a "vehicle ID") can refer to any unique identifier useful in identifying a particular receiving vehicle. The vehicle ID may be associated with a particular non-autonomous receiving vehicle or a particular autonomous receiving vehicle, and may be provided to the system. In one aspect, the vehicle ID can include a unique identifier such as a Vehicle Identification Number, license plate information, electronic signals transmitted from a vehicle, specific indicia or paint schemes, symbols (e.g., on a roof or upper surface of a vehicle), specific heat signature, and/or specific audio signature. In another aspect, the vehicle ID can include a digital identifier. The digital identifier can include a SIM card ID, ESN, MEID, IMEI, a phone number or other identifier associated with a wireless communication device onboard the vehicle. Such wireless communication devices can include wireless telephony devices, cellular telephones, cellular communications systems, digital communications systems, satellite communications systems, or any other electronic device associated with or onboard the vehicle. Other forms of identifiers are also applicable in some implementations. Heat signatures observed from a camera of the system (e.g., a camera on the UAV) and/or a camera that is external to the system and that the system has access to (e.g., a satellite camera and/or a traffic camera).

With respect to identification of the receiving vehicle, it can be appreciated based on numerous examples provided herein that the receiving vehicle can be identified by an active mechanism (e.g., a signal generated by the receiving vehicle) and/or by a passive mechanism (e.g., a camera and/or other sensor of the UAV identifying a property, shape, heat signature, and/or an indicia or paint scheme of the receiving vehicle). As used herein, identifying the receiving vehicle by an active mechanism refers generally to identifying the receiving vehicle based on a signal that is actively generated by the receiving vehicle. Exemplary actively generated signals include, but are not limited to, electromagnetic signals such as radio signals, light emission patterns such as headlights and taillights flashed according to a predetermined pattern, GPS data transmitted to the system from the receiving vehicle, audible signals such as a sound produced by an engine and/or electric motor of the receiving vehicle, and/or any other suitable signal (visual or nonvisual) that the receiving vehicle can generate. Audible sounds can be used to distinguish vehicles from one another, such as an engine sound, distinctive tire noise, etc. In such embodiments, a microphone on the UAV or another location can generate a signal that can be interpreted by the system. As used herein, the techniques for identifying the receiving vehicle by a passive mechanism generally involves identifying the receiving vehicle based on one or more characteristics of the receiving vehicle. Exemplary characteristics include, but are not limited to, a license plate number, a make and model of the receiving vehicle, the color of the receiving vehicle, a paint scheme of the receiving vehicle, or any other suitable characteristic that can be used to identify the receiving vehicle.

In some implementations, the UAV may perform multi-factor identification of the receiving vehicle wherein at least one factor is a passive identification factor and another factor is an active identification factor. In some implementations, the UAV may identify a subset of vehicles within a rendezvous area that could potentially be the receiving vehicle based on a body type and/or color. For example, the UAV may identify one or more 2017 FORD EXPLORER vehicles that are black in color within the rendezvous area. Then, the UAV may identify an individual one of these identified vehicles as the receiving vehicle based on a specific signal being emitted by and/or from the receiving vehicle. Specifically, the UAV may identify which one of the subset of vehicles is currently emitting predetermined radio signals and/or a predetermined light emission pattern as described elsewhere herein.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
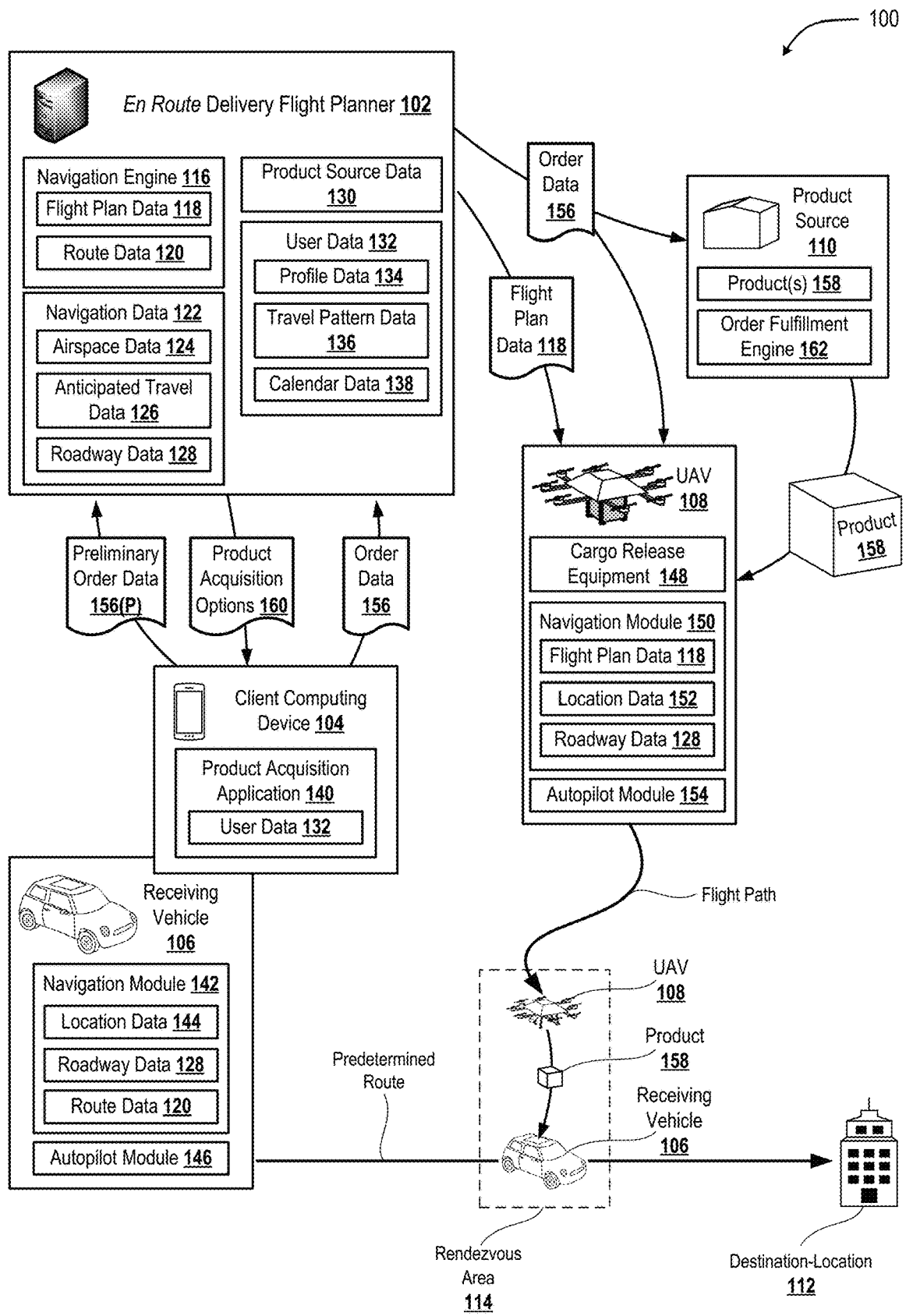
FIG. 1 illustrates an example workflow scenario to facilitate an en route delivery of a product from an unmanned aerial vehicle (UAV) to a receiving vehicle that is traveling to a destination-location.

The following Detailed Description describes technologies for facilitating an en route product delivery during which a product is transferred from an unmanned aerial vehicle (UAV) to a receiving vehicle that is navigating toward a destination-location. Generally described, the UAV is dispatched to carry the product along a flight path that converges with a route on which the receiving vehicle is traveling toward the destination-location. Once the UAV is within the vicinity of the receiving vehicle at the rendezvous area, the UAV may then approach the receiving vehicle from overhead and, ultimately, may align the product with respect to the receiving vehicle and/or an opening thereof to facilitate a transfer of the product to the receiving vehicle. For example, the UAV may be configured to identify the receiving vehicle (e.g., based on an active mechanism and/or a passive mechanism as described herein) and then fly above the receiving vehicle to achieve a predetermined alignment between the product (e.g., which may be releasably coupled to the UAV) and an open sunroof of the receiving vehicle. The UAV may further be configured to release the product at the predetermined alignment to cause the product to fall along a trajectory that passes through the open sunroof or another opening of the receiving vehicle. In some examples, the UAV may be configured to calculate the trajectory based on environmental conditions (e.g., air density and/or relative wind), a velocity of the UAV and a corresponding fluid drag on the product, and/or a height of the UAV above the receiving vehicle. For example, the UAV may hover above a receiving vehicle that is traveling along a highway and may calculate the trajectory to determine how to adjust the predetermined alignment to effectively "lead" the receiving vehicle so that the product trajectory passes through the open sunroof. In some configurations, the system can include a mechanism for controlling a window, door, sunroof, and/or any other suitable opening of the receiving vehicle. In such embodiments, the system can send control signals to automatically open a window, door, a sunroof, and/or any other suitable opening through any suitable form of wireless communication.

In some implementations, the UAV may be configured to release the product to allow the product to fall through the open sunroof (or any other opening of the receiving vehicle) if, and only if, the UAV is within a predetermined vertical distance from the receiving vehicle, e.g., a predetermined height above the receiving vehicle. For example, the UAV may be configured to release the product when the UAV is within three inches from the receiving vehicle, six inches from the receiving vehicle, nine inches from the receiving vehicle, one foot from the receiving vehicle, or any other suitable vertical distance. In some implementations, the predetermined vertical distance may be determined based on current environmental conditions (e.g., wind, relative humidity, ambient temperature, etc.), a velocity of the receiving vehicle (e.g., the predetermined vertical distance may be inversely or directly related to the vehicle speed such that the UAV may be closer to or farther from, respectively, the receiving vehicle as the speed of the receiving vehicle increases), a value of the product (e.g., the UAV may drop more expensive products and/or more fragile products from a lower height), upcoming road conditions and/or features (e.g., upcoming turns, upcoming tunnels, upcoming traffic signals, etc.), and/or any other suitable factor for consideration in determining from how high a particular product can be dropped.

The disclosed systems and techniques thus mitigate the need for people that desire a product while traveling between locations to choose between a first inconvenient option of "picking-up" the product at a source of the product (which increases travel time) or a second inconvenient option of going without the product and continuing on to the destination-location (which leaves a consumer with an unmet desire and/or need for the product). Accordingly, the disclosed systems and techniques represent a substantial advance over conventional UAV delivery services which are limited to delivering products to static GPS coordinates that are determined prior to dispatching a delivery UAV based on a delivery address provided by a consumer.

Turning now to FIG. 1, an example workflow scenario is illustrated with respect to a system 100 that enables a UAV to perform an en route delivery of a product to a receiving vehicle that is traveling towards a destination-location. As used herein, the term "en route delivery" may generally refer to a delivery that occurs at a public location at which a recipient of the delivery will only be located temporarily while traveling between two or more locations. An exemplary en route delivery may include, but is not limited to, a delivery of a lunch item to a recipient that is traveling in a self-driving car (e.g., a TESLA MODEL S) on a roadway system to a destination-location to attend a scheduled meeting. In this way, the recipient can accept delivery of the lunch item while concurrently traveling directly to the destination-location. Another exemplary en route delivery may include, but is not limited to, a delivery of a fishing bait item to a recipient that is traveling in an offshore fishing boat (e.g., a Scout 420 LXF) on the ocean to a destination-location to go fishing. In this way, the recipient can obtain depleted and/or forgotten fishing supplies without having to return to shore and travel inland to a supply shop.

As illustrated, the system 100 may include an en route delivery flight planner 102 that may receive, from a client computing device 104, order data that indicates a selection of a product for delivery to a receiving vehicle 106 by a UAV 108. The system 100 may communicate at least some of the order data to a product source 110 at which location the product is releasably coupled to the UAV 108 (e.g., to enable the UAV 108 to "drop" the product while hovering above the receiving vehicle 106). Exemplary product sources include, but are not limited to, fulfillment centers (e.g., packing warehouses that focus on shipping small parcels direct-to-consumers), restaurants, and/or brick-and-mortar retail stores. Once the product is releasably coupled to the UAV 108 at the product source 110, the UAV 108 may be dispatched while the receiving vehicle 106 is en route to a destination-location 112 to rendezvous with the receiving vehicle 106 at a rendezvous area 114. Ultimately, the UAV 108 performs a transfer protocol within the rendezvous area 114 to deliver the product to an order recipient that is an occupant of the receiving vehicle 106.

The en route delivery flight planner 102 may include a navigation engine 116 to generate flight plan data 118 for the UAV 108 and/or route data 120 for the receiving vehicle 106. In some implementations, the flight plan data 118 may at least partially define a flight path for the UAV 108 to travel along to rendezvous with the receiving vehicle 106 within the rendezvous area 114. In some implementations, the route data 120 for the receiving vehicle 106 may define one or more suggested routes for the receiving vehicle 106 to take to the rendezvous area 114 to optimize efficiencies with respect to the en route delivery to be performed by the UAV 108.

The flight plan data 118 for the UAV 108 may be determined based at least in part on navigation data 122. In some implementations, the navigation data 122 includes airspace data 124 that includes, but is not limited to, information associated with environmental characteristics of a public airspace that the UAV 108 is currently permitted to travel within and/or airspace restrictions that define volumes of airspace that the UAV 108 is restricted from traveling within. For example, when generating the flight plan data 118, the navigation engine 116 may weigh factors such as current air density and/or wind conditions between the product source 110 and the rendezvous area 114 as well as current airspace restrictions such as Temporary Flight Restrictions (TFRs) corresponding to a radius of airspace surrounding a current public event (e.g., the UAV 108 may be restricted from traveling within three nautical miles of a current professional football game). In some implementations, the navigation data 122 includes anticipated travel data 126 that indicates a route that the receiving vehicle 106 is expected to travel along toward the destination-location 112. The navigation engine 116 may receive the anticipated travel data 126 from the client computing device 104 and/or the receiving vehicle 106. For example, the anticipated travel data 126 may be included within the order data that indicates the selection of the product for delivery to the receiving vehicle 106. As another example, the en route delivery flight planner 102 may "ping" the receiving vehicle 106 and/or the client computing device 104 with a request for the anticipated travel data 126 in response to receiving the order data.

In various implementations, the flight plan data 118 may be based on predetermined obstacle data such as, for example, predetermined locations of tunnels, overpasses, road signs, etc. In this way, the flight plan data 118 may be designed to avoid deliveries within rendezvous areas having many obstacles. In various implementations, the UAV 108 may be configured with obstacle avoidance capabilities to detect and avoid obstacles while performing an en route product delivery. For example, the UAV 108 may detect an obstacle (e.g., a freeway sign, a traffic sign, etc.) that overhangs a highway while performing a delivery. The UAV 108 may temporarily abort the delivery until it has cleared the obstacle. As another specific and non-limiting example, the UAV 108 may detect and avoid a tunnel (e.g., by not flying into the tunnel) and, ultimately, may estimate when the receiving vehicle will exit the tunnel to coordinate with, e.g., "pace," the receiving vehicle and arrive at the other side at roughly the same time.

In some implementations, the flight plan data 118 for the UAV 108 and/or the route data 120 for the receiving vehicle 106 may be determined based at least in part on roadway data 128 (e.g., that is included within the navigation data 122) that indicates a map of a roadway system that the receiving vehicle 106 drives on to arrive at the rendezvous area 114. For example, the roadway data 128 may indicate a plurality of different roads, intersection points between the different roads, and/or characteristics of the different roads on the predetermined route of the receiving vehicle 106. Exemplary characteristics of the different roads include, but are not limited to, speed limits, construction activity, real-time traffic conditions, and/or any other characteristic of a public roadway system that may be beneficial in determining when and/or where the UAV 108 may efficiently rendezvous with the receiving vehicle 106. In some implementations, the roadway data 128 may include crowd-sourced information provided by a plurality of members of an online traffic and road information sharing community (e.g., the WAZE® community facilitated by GOOGLE®).

In some implementations, the flight plan data 118 for the UAV 108 and/or the route data 120 for the receiving vehicle 106 may further be determined based at least in part on product source data 130 that indicates locations for one or more sources of the product. For example, in an instance where the product is a particular fungible good that is supplied by an online retailer having a plurality of geographically dispersed fulfillment centers (e.g., an AMAZON BASICS cell phone charger cable provided by AMAZON®), the product source data 130 may indicate locations for several individual fulfillment centers of the online retailer within a predetermined distance from the receiving vehicle 106 and/or the anticipated route of the receiving vehicle 106. Accordingly, the navigation engine 116 may analyze the product source data 130 with respect to the navigation data 122 to select a fulfillment center and further determine a flight path from the selected fulfillment center to the rendezvous area 114. As another example, in an instance where the product is a specific value meal option (e.g., a BIG MAC® Value Meal) that is offered by a restaurant franchise (e.g., MCDONALD'S®), the product source data 130 may indicate locations for several individual restaurants of the restaurant franchise within the predetermined distance from the receiving vehicle 106 and/or anticipated route thereof. Accordingly, the navigation engine 116 may analyze the product source data 130 with respect to the navigation data 122 to determine a flight path that includes a first segment associated with navigating the UAV 108 from an initial-location to the product source 110 (e.g., wherein a MCDONALD'S® employee may releasably couple the product to the UAV 108) and a second segment associated with navigating the UAV 108 from the product source 110 to the rendezvous area 114.

In some implementations, the route data 120 and/or the anticipated travel data 126 for the receiving vehicle 106 (and correspondingly the flight plan data 118 for the UAV 108 since the flight path may ultimately be designed to cause the UAV 108 to rendezvous with the receiving vehicle 106) may further be determined based on user data 132 corresponding to a user associated with the order data such as, for example, an intended recipient of the product. The user data 132 may include profile data 134 that indicates identification information of the user, payment information associated with the user, and/or past purchase information associated with the user. For example, the profile data 134 may indicate a name of the user and credit card information that the user provided when a previous en route product delivery was ordered. The user data 132 may include travel pattern data 136 that indicates one or more historical travel patterns associated with the user. For example, the travel pattern data 136 may indicate a plurality of past routes that the user has traveled as well as a frequency with which the past routes were traveled and/or a time of day that the past routes were traveled. In some implementations, the navigation engine 116 is configured to infer one or more aspects of the anticipated travel data 126 based on the travel pattern data 136. For example, the travel pattern data 136 may indicate that the user regularly travels to the destination-location 112 each Wednesday and Friday between the hours of 11 AM and 12:30 PM. Under these circumstances, when order data is received from this user during or shortly before these hours on a Wednesday or a Friday, the navigation engine 116 may infer that the user will be traveling to the destination-location 112 and may generate one or more aspects of the anticipated travel data 126 based on this inference. The user data 132 may also include calendar data 138 that indicates one or more calendar events of the user. For example, the calendar data 138 may indicate that the user has a meeting scheduled at the destination-location 112 at 12:30 PM on the current day. Under these circumstances, when order data is received for delivery shortly before 12:30 PM on the current day, the navigation engine 116 may infer that the user will be en route to the destination-location 112 when the delivery is to be performed and may generate aspects of the anticipated travel data 126 based on this inference.

In some implementations, receiving vehicles can be prioritized and a flight plan can be modified based on such priorities. For example, the system can schedule multiple deliveries with the same delivery vehicle for different receiving vehicles. The system can determine the order, source and delivery locations, e.g. based on priority of the receiving parties. In one illustrative example, a CEO of a company might have a higher delivery priority than a low-level employee. In yet another example, a University professor might have a higher delivery priority than a student. The priorities can be based on a position, status, title, or any other hierarchy, including a hierarchy based on a subscription fee. Different types of users can be prioritized as desired, e.g., a subscribing user can receive deliveries before a single time paying user or charity user. Priorities can be based on tasks of job function. For example, critical or medically related jobs can receive deliveries before everything else.

In some implementations, the intended recipient of the product may be temporarily associated with the receiving vehicle 106. For example, the intended recipient may be an occupant of a taxi, a bus, a rental vehicle, a rideshare vehicle, and/or any other mode of transportation with which an occupant may be temporarily associated. Temporary associations can be made through any suitable source, such as data that can be generated by tracking the intended recipient's mobile phone, or the user account the recipient uses to schedule a ride in the receiving vehicle 106. As a more specific but nonlimiting example, the intended product recipient may sign into his or her UBER account to schedule transportation to the destination-location 112. Under these circumstances, the system 100 may be configured to determine one or more identifying characteristics of the receiving vehicle 106 and temporarily associate the receiving vehicle with the intended product recipient. In some implementations, the intended recipient of the product may be permanently associated with the receiving vehicle 106. For example, the intended product recipient may be an owner of the receiving vehicle 106. In various implementations, the system 100 may be configured to prompt the intended product recipient (and/or another person who generates the order data) for an indication as to whether the receiving vehicle 106 for a particular order is a predetermined receiving vehicle that is permanently associated with the intended product recipient (e.g., a vehicle which the intended product recipient has permanently associated with his or her online retailer account used to place the order), or is a vehicle for which the system 100 does not currently have identifying information and/or has yet to associate with the intended recipient. In an instance where the receiving vehicle 106 is the vehicle that is permanently associated with the intended recipient, the predetermined receiving vehicle may be selected from a list of one or more receiving vehicles already associated with the intended recipient. In an instance where the receiving vehicle 106 is not currently associated with the intended recipient (e.g., the receiving vehicle is an UBER vehicle which the intended recipient has not previously utilized), the intended recipient may be prompted to provide identifying information to enable the system 100 and/or the UAV 108 to identify the receiving vehicle 106 within the rendezvous area 114.

The client computing device 104 may include a product acquisition application 140 to enable the user to generate the order data that indicates the selection of the product for delivery to the receiving vehicle 106. As illustrated, the product acquisition application 140 may have access to and/or generate one or more portions of the user data 132. As further illustrated, the client computing device 104 is shown to overlap with the receiving vehicle 106 to indicate that the client computing device 104 may be within an interior region of the receiving vehicle 106 or may be outside of the receiving vehicle 106 when the order data is generated. In some implementations, the client computing device 104 may be a mobile computing device such as, for example, a laptop computer, a tablet computer, a smart phone, or any other type of mobile computing device. For example, the client computing device 104 may be a smart phone computing device configured with GPS navigation capabilities and configured to send and receive data via a network (e.g., a 4G network, an LTE network, a WLAN network, or any other suitable network). In this example, the product acquisition application 140 may be a mobile shopping application provided by an online retailer (e.g., AMAZON SERVICES, LLC). Thus, the order data may be generated via a mobile computing device that is running the product acquisition application 140 and is being controlled by a user that is riding within the receiving vehicle 106. In some implementations, the order data may correspond to a recurring order of the product for delivery to the receiving vehicle 106. For example, a consumer may elect to have a particular lunch order delivered to his or her vehicle each Wednesday and Friday while traveling across town during lunch hour.

The receiving vehicle 106 may include a navigation module 142 to provide real-time navigation instructions to guide the receiving vehicle 106 toward the destination-location 112. For example, the navigation module 142 may be configured with one or more components (e.g., a GPS component, a Galileo positioning component, a GLONASS positioning component, and/or any other suitable positioning component) for determining location data 144 that indicates one or more real-time locations of the receiving vehicle 106. The navigation module 142 may then analyze the location data 144 with respect to the public roadway data 128 to generate the real-time navigation instructions for guiding the receiving vehicle 106 toward the destination-location 112. In some implementations, the receiving vehicle 106 may further include an autopilot module 146 to enable the receiving vehicle 106 to be at least partially self-driving (i.e., at least partially autonomous). Exemplary capabilities of the autopilot module 146 include, but are not limited to, speed management to maintain a speed of the receiving vehicle 106 with respect to a speed limit, object tracking to identify obstacles and perform avoidance maneuvers such as turning and/or braking, lane following to keep the receiving vehicle 106 within lanes marked on a public roadway, traffic signal monitoring to identify road signs and/or traffic lights and react accordingly, and/or any other capability suitable for an autopilot module for inclusion within an automobile. In some embodiments, the navigation module 142 may supply real-time navigation instructions to a human operator of the receiving vehicle 106. For example, the navigation module 142 may audibly recite and/or visibly display upcoming navigation maneuvers (e.g., an upcoming exit to take, an upcoming turn to make, a current or upcoming speed limit, etc.)

The UAV 108 may include cargo release equipment 148 that is configured to releasably couple the product to the UAV 108 while the UAV 108 transports the product from the product source 110 to the rendezvous area 114. In some implementations, the cargo release equipment 148 may include one or more mechanical arms that are configured to grasp the product and/or packaging that encloses the product. For example, as described in more detail with respect to FIGS. 2A & 2B, the cargo release equipment 148 may include at least two opposable arms that are configured to wrap around at least two sides of the product and/or to support a bottom of the product while the UAV 108 transports the product to the rendezvous area 114. Then, the UAV 108 may open the opposable arms to release the product and, ultimately, to facilitate a transfer of the product from the UAV 108 to the receiving vehicle 106. In some implementations, the cargo release 48 may include a tether that anchors the product to the UAV 108 and is extendable by the UAV 108 to raise and/or lower the product with respect to the UAV 108 while the UAV 108 is flying. For example, as described in more detail with respect to FIGS. 3A & 3B, the cargo release equipment 148 may include a tether that is deployable by the UAV 108 to suspend the product adjacent to a side window of the receiving vehicle 106 to enable an occupant of the receiving vehicle 106 to reach out through the open side window and pull the product into an interior region of the receiving vehicle 106. Then, the UAV 108 may be configured to release the product from the tether and retract the tether.

The UAV 108 may further include a navigation module 150 to provide real-time navigation instructions to guide the UAV 108 based on the flight plan data 118 toward the rendezvous area 114 to rendezvous with the receiving vehicle 106 that is en route to the destination-location 112. For example, the navigation module 150 may be configured with one or more components (e.g., a GPS component, a Galileo positioning component, a GLONASS positioning component, and/or any other suitable positioning component) for determining location data 152 that indicates one or more real-time locations of the UAV 108. The navigation module 150 may analyze the location data 152 with respect to the navigation data 122 to generate the real-time navigation instructions which are ultimately provided to an autopilot module 154 that enables the UAV 108 to be fully autonomous (e.g., capable of operating safely without human input) and/or at least partially autonomous (e.g., capable of operating safely with merely intermittent human input). The autopilot module 154 may include, but is not limited to, those features discussed with respect to the autopilot module 146. In some embodiments, the navigation module 150 may supply real-time navigation instructions to a human operator of the UAV 108. For example, the navigation module 150 may audibly recite and/or visibly display upcoming navigation maneuvers (e.g., an upcoming flight path segment, an upcoming obstacle avoidance maneuver, or an upcoming restricted flight zone, etc.) to a human operator of the UAV 108 that is at least partially controlling the UAV 108 from a remote location (e.g., a fulfillment center from which the UAV 108 is stationed out of).

In some implementations, the system 100 may be configured to facilitate establishment of a communications link between the autopilot module 146, of the receiving vehicle 106, and the autopilot module 154 of the UAV 108. Then, in some examples, the receiving vehicle 106 may transmit maneuver data indicating one or more impending vehicle maneuvers that the receiving vehicle 106 is about to perform. The UAV 108 may receive the maneuver data and simultaneously perform one or more corresponding flight maneuvers above the receiving vehicle 106 to maintain an alignment of the UAV 108 with respect to the receiving vehicle 106. For example, the autopilot module 146 of the receiving vehicle 106 may identify slowing traffic ahead and may respond by quickly reducing a velocity of the receiving vehicle 106. Under these circumstances, the autopilot module 146 of the receiving vehicle 106 may transmit maneuver data to the autopilot module 154 of the UAV 108 so that the UAV 108 and the receiving vehicle 106 can slow at an identical and/or substantially identical rate rather than the UAV 108 having to react subsequent to the receiving vehicle 106 beginning to slow.

With respect to the workflow scenario of FIG. 1 (i.e., the transfers of data and/or movement of physical objects associated with implementing the techniques described herein), the en route delivery flight planner 102 is shown to receive order data 156 from the product acquisition application 140 that is running on the client computing device 104. The order data 156 indicates a selection of the product 158, which can be obtained from the product source 110, for delivery to the receiving vehicle 106 while en route to the destination-location 112. In some implementations, the order data 156 includes the anticipated travel data 126 to inform the en route delivery flight planner 102 of a route on the roadway system that the receiving vehicle 106 will travel toward the destination-location 112. The anticipated travel data 126 may further indicate a travel-schedule of the receiving vehicle 106 with respect to the predetermined route. Specifically, the travel-schedule includes information that indicates a timeline within which the receiving vehicle 106 is expected to progress along the predetermined route. For example, the travel-schedule may indicate a plurality of points along the predetermined route and corresponding times at which the receiving vehicle 106 is expected to reach individual ones of the plurality points. In some implementations, the order data 156 may be devoid of the anticipated travel data 126 such that the en route delivery flight planner 102 may be configured to obtain the anticipated travel data 126 from alternate sources. For example, the en route delivery flight planner 102 may obtain the anticipated travel data 126 from the navigation module 142 of the receiving vehicle 106. Additionally or alternatively, the en route delivery flight planner 102 may be configured to infer the anticipated travel data 126. For example, the en route delivery flight planner 102 may infer the anticipated travel data 126 based on one or more aspects of the user data 132 and/or the location data 144.

In some implementations, the order data 156 may correspond to a selection of an individual product-acquisition option of a plurality of product-acquisition options 160 that are provided by the en route delivery flight planner 102. For example, as illustrated, product acquisition application 140 is shown to provide preliminary order data 156(P) to the en route delivery flight planner 102. The preliminary order data 156(P) may indicate one or both of a selection of the product 158 and/or a classification associated with the product 158. For example, the preliminary order data 156(P) may indicate a selection of the product as a specific value meal option that is offered by a restaurant franchise (e.g., a BIG MAC® Value Meal offered by MCDONALD'S®) and which can be obtained at any one of numerous different physical locations for the restaurant franchise along the route. Additionally or alternatively, the preliminary order data 156(P) may indicate a selection of a value meal option classification under which numerous other specific value meals are also classified from one or more different restaurants. Stated plainly, the preliminary order data 156(P) may indicate that the user is interested only in receiving the specific value meal option or that the user is interested in receiving a value meal option in general.

In response to receiving the preliminary order data 156(P), the en route delivery flight planner 102 may determine a plurality of product-acquisition options 160 based on one or both of the product source data 130 and the anticipated travel data 126. Individual ones of the plurality of product-acquisition options 160 may indicate a particular source from which a product can be obtained, details regarding the product (e.g., a cost of the product, a product-type, nutrition information associated with the product (where applicable), or any other suitable details). As a more specific but non-limiting example, the preliminary order data 156(P) may indicate that the user is interested in obtaining a meal (e.g., a classification associated with the product 158) while traveling in the receiving vehicle 106 to the destination-location 112. In this example, the plurality of product-acquisition options 160 may include a first product acquisition option that the user can select to order a hamburger and fries from a first product source and a second product acquisition option that the user can select to order a turkey sandwich and an apple from a second product source. The product-acquisition options 160 may further indicate where along the predetermined route each suggested product can be delivered to the receiving vehicle 106 and/or a cost of delivering each suggested product to the receiving vehicle 106.

As further illustrated, the product-acquisition options 160 are provided to the client computing device 104 which, ultimately, communicates details associated with the product-acquisition options 160 to the user. For example, the client computing device 104 may include a display configured to visually communicate details associated with the product-acquisition options 160. Additionally or alternatively, the client computing device 104 may be configured to audibly communicate details associated with the product-acquisition options 160. In such implementations, the client computing device 104 further enables the user to select one or more individual ones of the product-acquisition options 160 to generate the order data 156 (e.g., by selecting a user interface element corresponding to a particular product-acquisition option). Thus, it can be appreciated that in some implementations, the user may provide the en route delivery flight planner 102 with preliminary order data 156(P) that indicates an interest in ordering the product 158 but does not yet actually place an order for the product. In some configurations, the system 100 can also automatically select one or more sources from the product-acquisition options 160 based on the data described herein. In such embodiments, the system 100 can automatically generate order data 156 and, as described below, generate flight plan data 118 for navigating to and/or from the location of the selected sources. Then, based on the preliminary order data 156(P), the en route delivery flight planner 102 may determine and provide back to the user the plurality of product-acquisition options 160 from which the user can select to order one or more products 158.

In response to receiving the order data 156, the en route delivery flight planner 102 may generate the flight plan data 118 and, ultimately, may provide the flight plan data 118 to the UAV 108 to dispatch the UAV 108 along the flight path to the rendezvous area 114 and, in some instances, the product source 110. For example, as described above, the flight path may include a first segment associated with navigating the UAV 108 from an initial-location to the product source 110 (e.g., to obtain the product) and a second segment associated with navigating the UAV 108 from the product source 110 to the rendezvous area 114 to facilitate transfer of the product from the UAV 108 to the receiving vehicle 106. Accordingly, dispatching the UAV 108 may include first dispatching the UAV 108 to the product source 110 and then subsequently dispatching the UAV 108 to the rendezvous area 114. In some configurations, the UAV 108 can be dispatched by the generation of dispatch data that is configured to cause the UAV 108 to navigate from a first point, e.g., an initial-location, to a second point, e.g., a source-location or the rendezvous area 114. For example, the system 100 may be configured to generate and transmit the dispatch data to the UAV 108 via a wired or wireless communications link. Exemplary dispatch data may include the flight plan data 118 and an indication as to whether the UAV 108 has been cleared to take off.

In some implementations, the en route delivery flight planner 102 transmits at least some of the order data 156 to the product source 110 to prompt the product source 110 to begin preparing the product 158. For example, in an instance in which the product 158 is a specific value meal option, the en route delivery flight planner 102 may transmit the order data 156 to the selected physical location of the restaurant franchise to prompt preparation of the specific value meal option. In some implementations, the product source 110 may operate an order fulfillment engine 162 to manage orders received from the en route delivery flight planner 102. For example, the order fulfillment engine 162 may receive the order data 156 and determine when the product source 110 (and/or staff thereof) should begin preparation of the product 158. As a more specific but nonlimiting example, a user may transmit the order data 156 to the en route delivery flight planner 102 which relays this order data 156 to the product source 110 far in advance (e.g., three hours before, one day before, etc.) of when the en route delivery is to be performed within the rendezvous area 114. In this example, the order fulfillment engine 162 may submit details corresponding to the order data 156 into an order queue of the product source 110 at an appropriate time to ensure that the product 158 is freshly prepared when the delivery is performed within the rendezvous area 114.

As illustrated, in some implementations, the UAV 108 may be configured to provide one or more aspects of the order data 156 to the product source 110. For example, the UAV 108 may be caused to land in a designated product loading area at the product source 110 and to communicate aspects of the order data 156 to the product source 110. As a more specific but nonlimiting example, the UAV 108 may land on a roof of the product source 110 that is designated as the product loading area and on which one or more employees may be tasked with loading UAVs 108 as they arrive and communicate aspects of the order data 156. In some implementations, communicating the order data 156 may include wirelessly transmitting order data via a Near Field Communication (NFC) protocol to a computing device of the product source 110 (e.g., a tablet computer operated by or more employees).

In the illustrated implementation, after the UAV 108 arrives at the product source 110, the product 158 may be releasably coupled to the UAV 108 via the cargo release equipment 148. For example, one or more staff members of the product source 110 may manually place the product 158 within the cargo release equipment 148 of the UAV 108. Once the product 158 is received from the product source 110, the UAV 108 may proceed to navigate along a second segment of the second route to rendezvous with the receiving vehicle 106 within the rendezvous area 114. Ultimately, the system 100 causes the UAV 108 to approach the receiving vehicle 106 within the rendezvous area 114 to facilitate a transfer of the product 158 from the UAV 108 to the receiving vehicle 106 and/or an occupant thereof. For example, the UAV 108 may hover above the receiving vehicle 106 while the receiving vehicle 106 is driving down an interstate highway and, ultimately, activate the cargo release equipment 148 to "drop" the product 158 through an opening of the receiving vehicle 106.

In some examples, the product 158 may include electric power and/or a fluid such as fuel or water. In such embodiments, the UAV 108 can be used to transfer power, fuel, or any other fluid to the receiving vehicle 106. In such embodiments, the UAV 108 can control a robotic arm controlling charging cables or some form of tubing to a suitable connector or opening of the receiving vehicle 106.

Figure 2A:
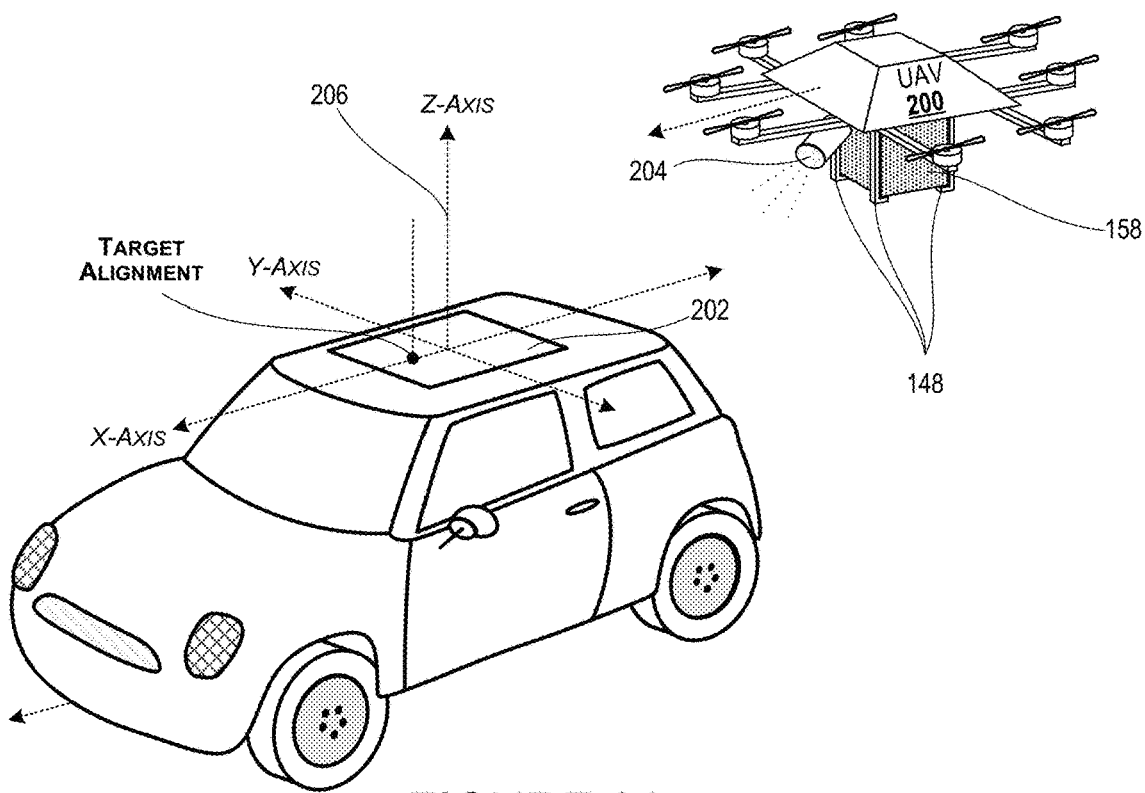
FIG. 2A illustrates a UAV with cargo release equipment in a first configuration that couples a product to the UAV.
Figure 2B:
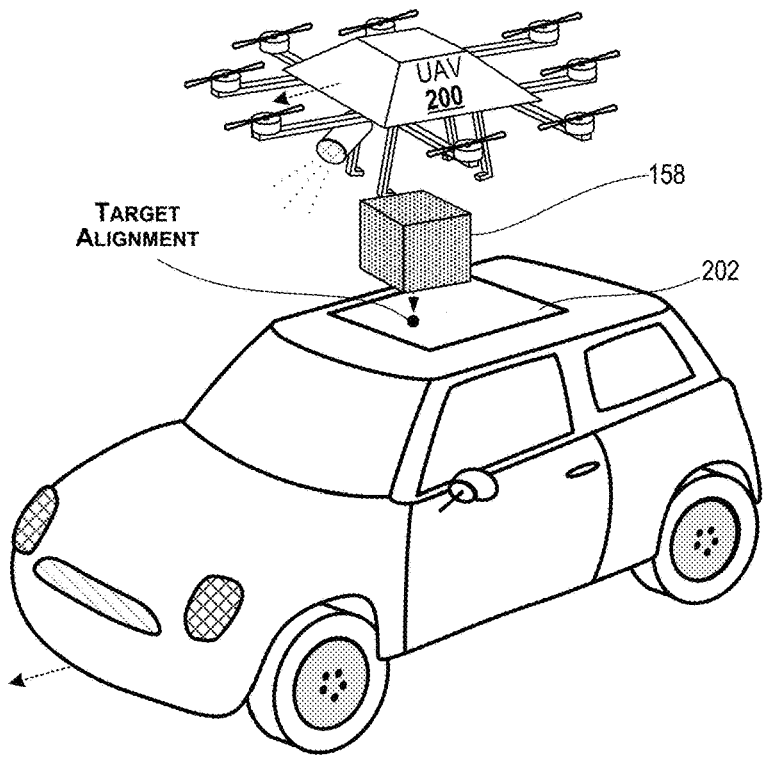
FIG. 2B illustrates the UAV of FIG. 2A with the cargo release equipment in a second configuration that releases the product from the UAV.

Turning now to FIGS. 2A and 2B (collectively referred to herein as FIG. 2), a UAV 200 is illustrated as approaching the receiving vehicle 106 with the product 158 releasably coupled to the cargo release equipment 148 and, ultimately, as transferring the product 158 through an opening 202 of the receiving vehicle 106. In particular, FIG. 2A illustrates the UAV 200 with the cargo release equipment 148 in a first configuration that couples the product 158 to the UAV 200. The first configuration enables the UAV 200 to carry the product 158 from the product source 110 to the rendezvous area 114 and to align the product 158 with respect to the opening 202. Furthermore, FIG. 2B illustrates the UAV 200 with the cargo release equipment 148 in a second configuration that releases the product 158 from the UAV 200. In the illustrated example, the second configuration enables the product 158 to drop from the UAV 200 along a trajectory that passes through the opening 202. Although this example illustrates the cargo release equipment 148 as a plurality of mechanical arms that are configured to grasp the product 158, it can be appreciated that the UAV 200 may be equipped with any type of cargo release equipment 148 for releasably coupling the product 158 to the UAV 200. In other examples, the cargo release equipment 148 may include a compartment having a mechanically controlled door that closes to seal the product 158 within the compartment and opens to release the product 158. For illustrative purposes, the term "releasably coupling" can include coupling a product to the UAV 200, in which a mechanical device that is controlled by the UAV 200 can cause the product to be released in response to one or more commands or signals generated by the UAV 200 or another computing system in communication with the UAV 200.

During implementation of the techniques described herein, the UAV 200 may be dispatched from the product source 110 to the rendezvous area 114 with the product 158. For example, the UAV 200 may be based out of (e.g., stationed at) a particular fulfillment center that warehouses the product 158 for an online retailer such that the UAV 200 resides at the particular fulfillment center when not in operation (e.g., when not traveling to a rendezvous area to fulfill an order). Then, upon a consumer placing an order with the online retailer (e.g., via the product acquisition application 140), the product 158 may be releasably coupled to the UAV 200 as cargo and the UAV 200 may be dispatched to the rendezvous area 114 to transfer the cargo to the receiving vehicle 106. In implementations where the UAV 200 is not based out of a fulfillment center that is selected to supply the product 158 or where the product 158 is not supplied by a fulfillment center whatsoever (e.g., the product 158 is a value meal provided by a restaurant franchise), the UAV 200 may further be dispatched from an initial-location to the product source 110 to obtain the product 158. In various implementations, the UAV 200 may further include one or more input and/or output devices that enable the UAV 200 to communicate aspects of the order data 156 to the product source 110. Accordingly, the UAV 200 may inform the product source 110 or an employee thereof which specific product is to be loaded into the cargo release equipment 148. Once the UAV 200 has determined that the product 158 has been loaded into the cargo release equipment 148, the UAV 200 may take-off and fly to the rendezvous area 114.

In some implementations, the UAV 200 includes one or more sensors 204 that may be used to monitor environmental surroundings of the UAV 200. For example, the UAV 200 may include computer vision systems to generate and analyze images of its surrounding environment. Additionally or alternatively, the UAV 200 may include an environmental obstacle sensing system to generate computer readable models of its surrounding environment. The UAV 200 may utilize the one or more sensors 204 to monitor a relative movement and/or position of the receiving vehicle 106 with respect to the UAV 200 and/or the product 158 affixed thereto while the UAV 200 flies within the vicinity of the receiving vehicle 106. In some implementations, the UAV 200 may be configured to establish a reference coordinate system with respect to the receiving vehicle 106 (e.g., while the receiving vehicle is operating on an interstate highway or other public road). For example, in the illustrated scenario in FIG. 2A, the UAV 200 has identified the opening 202 of the receiving vehicle 106 and has established the reference coordinate system 206 with respect to the opening 202 (e.g., at a centroid of the opening 202). The UAV 200 may then monitor physical characteristic data that is generated by the one or more sensors 204 and that indicates physical characteristics of the receiving vehicle 106 (e.g., a position of the receiving vehicle 106 and/or the opening 202 with respect to the UAV 200). Based on the physical characteristic data generated by the one or more sensors 204, the UAV 200 may adjust an alignment between the product 158 into the opening 202 of the receiving vehicle 106. The UAV 200 may then determine when the alignment has reached a predetermined alignment (e.g., an alignment associated with a trajectory that passes through the opening 202). Then, once the predetermined alignment has been achieved, the UAV 200 may alter the cargo release equipment 148 from the first configuration shown in FIG. 2A to the second configuration shown in FIG. 2B to facilitate a transfer of the product 158 through the opening 202 of the receiving vehicle 106.

As described herein, in some implementations the UAV 200 may transfer the product 158 into the receiving vehicle 106 while both vehicles are in motion. For example, the UAV 200) may fly above the receiving vehicle 106 and, while maintaining the predetermined alignment to the receiving vehicle 106, release the product 158 from the cargo release equipment 148 through the opening 202 of the receiving vehicle 106. Accordingly, when applicable under various circumstances, the UAV 200 may calculate the target alignment with the opening 202 to lead to a point within the opening 202 that the UAV 200 intends for the trajectory to pass through. For example, in the scenario illustrated in FIG. 2A, the calculated trajectory that the product 158 is expected to utilize for product delivery is the centroid of the opening 202 which is illustrated as the point at which all three of the X-axis. Y-axis, and Z-axis intersect. In this example, because each of the UAV 200 and the receiving vehicle 106 are moving forward dynamically when the product 158 is released by the cargo release equipment 148, an amount of aerodynamic drag will inevitably slow the product 158 with respect to the receiving vehicle 106 so that the receiving vehicle 106 catches up with the product 158 by the amount that the target alignment leads the centroid of the opening 202. The techniques described herein, however, are not limited to such implementations. Rather, the transfer of the product 158 from the UAV 200 into the receiving vehicle 106 may occur while both vehicles are in motion, or alternatively while the receiving vehicle 106 and/or the UAV 200 is stopped. For example, in some implementations the UAV 200 may enter the rendezvous area 114 prior to the receiving vehicle 106 and then land to conserve energy (e.g., on a paved parking lot, on a street lamp, on a parked car, on a designated charging station, etc.) In some configurations, the UAV 200 can also land on a moving car to facilitate the transfer of a product. Then, once the receiving vehicle 106 enters the rendezvous area 114 the UAV 200 may take-off and approach the receiving vehicle 106 to deliver the product 158. In some implementations, a computing device can take over the control of both vehicles to coordinate the transfer. Such a computing device can be in the receiving vehicle, the delivery vehicle or the computing device can be a remote computer in communication with the vehicles via a network.

Figure 3A:
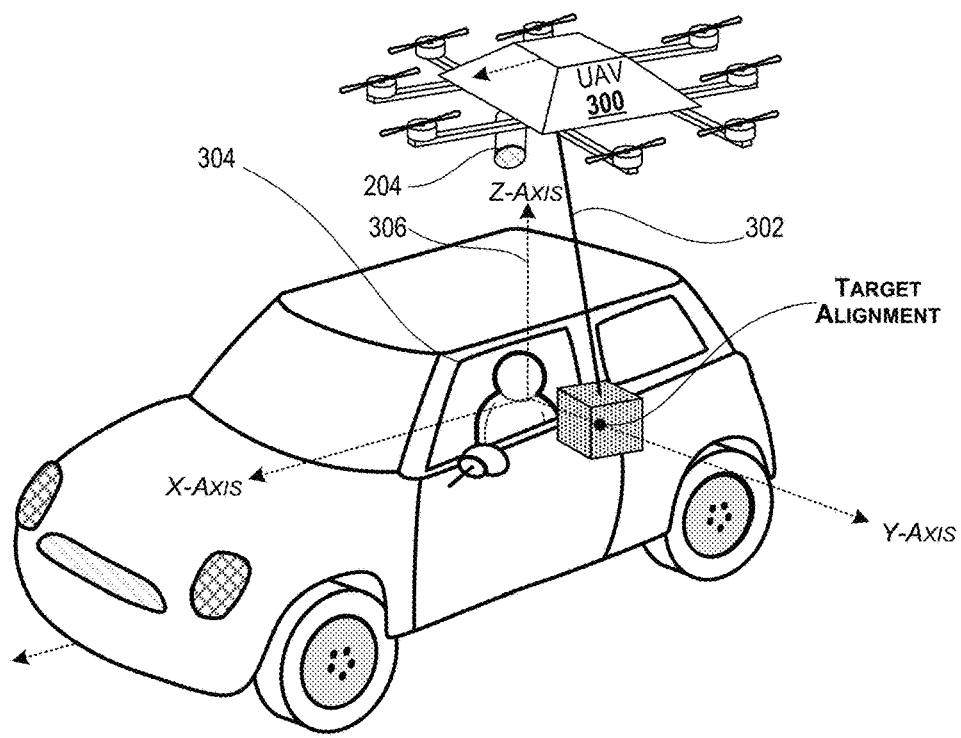
FIG. 3A illustrates a UAV with a tether that is extendable and retractable by the UAV to raise and lower a product.

Now turning to FIG. 3A, the UAV 300 is shown as suspending the product 158 adjacent to a side window 304 of the receiving vehicle 106. In the illustrated example, the UAV 300 is utilizing the one or more sensors 204 to establish a reference coordinate system 306 with respect to the side window 304. For example, in the illustrated scenario, the UAV 300 has identified the side window 304 and has selected the site opening 304 as the "opening" through which the product 158 will be transferred into the receiving vehicle 106. In some instances, the UAV 300 may be configured to select the side window 304 based at least in part on a determination that the receiving vehicle 106 does not include an opening in the roof through which the product 158 can be dropped. In some instances, an occupant 308 (labeled in FIG. 3B) may instruct the UAV 300 to select the side window 304 (e.g., The receiving vehicle 106 may be equipped with a sunroof but the occupant 308 may not want to open the sunroof due to rain). In some instances, the UAV 300 may be configured to determine weather conditions (e.g., whether it is clear or precipitating) and then may automatically select the side window 304 (or some other opening for that matter) based on the current weather conditions. For example, the UAV 300 may determine that it is raining based on one or more sensors (e.g., rain sensors) and/or by communicating weather data with a weather service. Then, based on a determination that the current weather conditions include rain, the UAV 300 may automatically select an opening, such as a sunroof or the side window 304. As further illustrated, the UAV 300 has established the reference coordinate system 306 at the centroid of the side window 304 and has selected a predetermined alignment (a.k.a. target alignment) that is centered on the side window 304 with respect to both the X-axis and the Z-axis but is offset from the centroid of the side window 304 on the Y-axis. In this way, the product 158 can be lowered adjacent to the side window 304 at a location that is easily retrieved by an occupant of the receiving vehicle 106, but which is also far enough away from the receiving vehicle 106 to reduce and/or eliminate physical contact between the product 158 and the receiving vehicle 106. Stated plainly, the UAV 300 can suspend the product 158 just outside the side window 304 at a distance that is close enough for the occupant to comfortably retrieve but which is sufficiently far enough away to prevent the product 158 from "bumping" into the receiving vehicle 106.

Figure 3B:
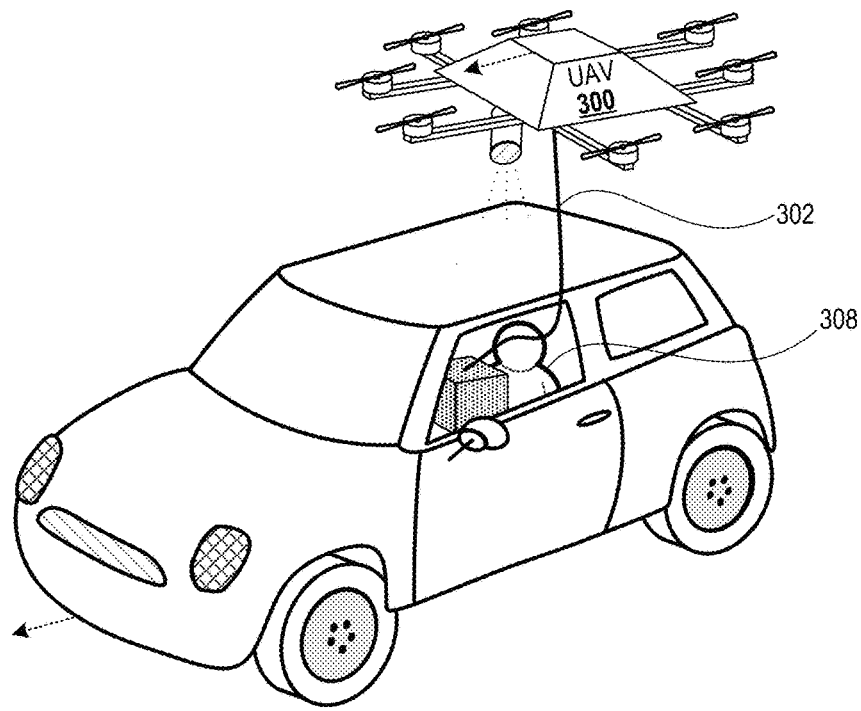
FIG. 3B illustrates the UAV of FIG. 3A with the tether extended toward an opening of the receiving vehicle to enable an occupant of the receiving vehicle to gain possession of the product.

With particular reference to FIG. 3B, the product 158 is shown to be in the possession of an occupant 308 of the receiving vehicle 106. For example, per the illustrated scenario, the occupant 308 may pull the product 158 into an interior region of the receiving vehicle 106. Then, the UAV 300 may release the product 158, retract the tether 302, and fly away from the receiving vehicle 106. In some implementations, the UAV 300 may release the product 158 from the tether 302 once the product 158 has passed through the opening (e.g., the side window 304 and/or the opening 202). For example, the UAV 300 may utilize the one or more sensors 204 to "watch" the product 158 while it is suspended from the tether 302 to determine when possession of the product 158 has been successfully transferred to the occupant 308. In some implementations, the UAV 300 may determine when possession of the product has been successfully transferred based on a reduction in tension on the tether 302. For example, the UAV 302 may determine when it is no longer supporting the full weight of the product 158 and, based thereon, presume that the occupant 308 is holding the product 158 and/or that the product 158 is resting on a surface within the interior region of the receiving vehicle 106 (e.g., The UAV 300 may lower the product 158 through a sunroof until the product 158 rests upon a passenger seat thus relaxing tension on the tether 302). Then, once possession has been transferred, the UAV 300 may release the product 158. For example, the cargo release equipment 148 may be affixed to a distal end of the tether 302 (i.e., the end of the tether 302 that is furthest from the UAV 300 as illustrated) and may be clipped onto a ring that is coupled to the product 158 (and/or packaging thereof).

Figure 4:
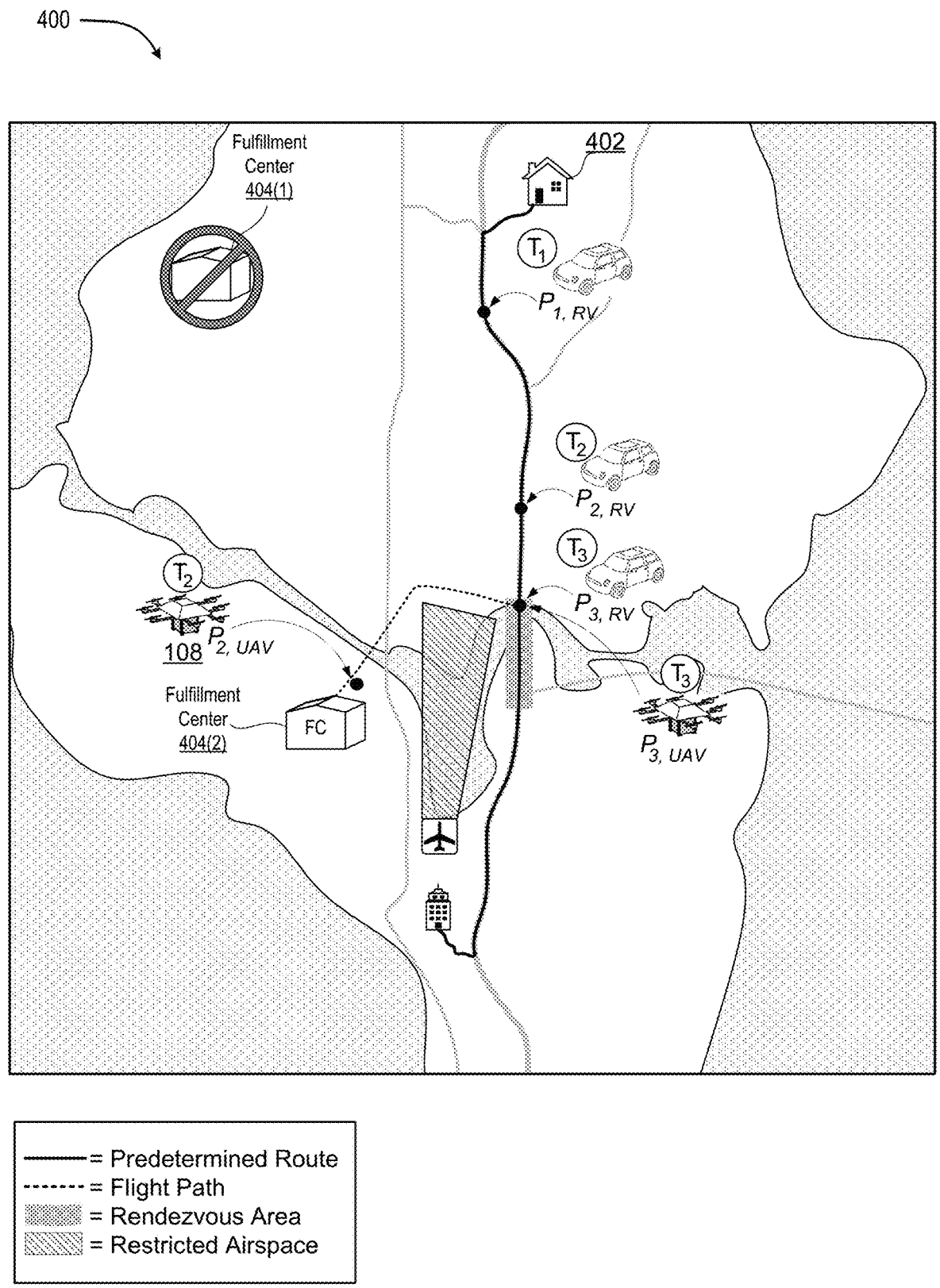
FIG. 4 illustrates various details of an area in which a UAV delivers a product to the receiving vehicle within the rendezvous area while the receiving vehicle is en route to a destination-location.

Turning now to FIG. 4, various details are illustrated of an area 400 in which a UAV 108 delivers a product to a receiving vehicle 106 within a rendezvous area 114 while the receiving vehicle 106 is en route to a destination-location 112. As illustrated, the receiving vehicle 106 travels along a predetermined route from an initial-location $P_{1,\ RV}$ to the destination location 112. Further illustrated along the predetermined route is a second-location $P_{2,\ RV}$ that the receiving vehicle 106 reaches at time $T_2$, a third-location $P_{1,\,RV}$ that the receiving vehicle 106 reaches at time $T_3$ (and that represents the beginning of the rendezvous area 114). As further illustrated, the UAV 108 travels along a flight path that begins at the first fulfillment center 404(1) and extends at least to the rendezvous area 114. Illustrated along the flight path is a second-location $P_{2,\,UAV}$ that the UAV 108 reaches at time $T_2$, a third-location $P_{3,\,UAV}$ that the UAV 108 reaches at time $T_3$ (and that also represents the beginning of the rendezvous area 114).

At time $T_1$, order data 156 is generated via the client computing device 104 and is transmitted to the en route delivery flight planner 102. The order data 156 indicates a selection of the product 158 and further indicates at least some of the anticipated travel data 126 indicating one or more times at which the receiving vehicle 106 is expected to reach one or more points along the predetermined route. For example, the navigation engine 116 may determine that the third-location $P_{3,\,UAV}$ is the closest location with which the UAV 108 may rendezvous with the receiving vehicle along the predetermined route while still avoiding one or more volumes of restricted airspace. The navigation engine 116 may further determine an amount of time that the UAV 108 will take to travel from the first fulfillment center 404(1) to the third location $P_{3,\,UAV}$. Then, the navigation engine 116 may estimate when the receiving vehicle 106 will reach the third-location (e.g., based on current travel conditions along the predetermined route) and, ultimately, may dispatch the UAV 108 when the UAV 108 and the receiving vehicle 106 will reach the rendezvous area 114 at substantially the same time.

At time $T_2$, the receiving vehicle 106 and the UAV 108 are both traveling along their respective routes towards the rendezvous area 114 where they will then be within the vicinity of one another.

At time $T_3$, the receiving vehicle 106 and the UAV 108 reach the rendezvous area 114 at substantially the same time when the UAV 108 searches for and ultimately identifies the receiving vehicle. It can be appreciated that designing and timing the flightpath so that the vehicles reach the rendezvous area at substantially the same time conserves energy resources for at least the reasons that the UAV 108 does not have to waste energy by hovering and waiting for the receiving vehicle 106, nor does the UAV have to waste energy by chasing down the receiving vehicle 106 if it has already reached and passed the third-location $P_{3,\,UAV}$. As described above, the UAV 108 can identify the receiving vehicle 106 based on active mechanisms and/or passive mechanisms. Furthermore, any specific examples provided herein are for illustrative purposes only and are not to be construed as limiting or exhaustive. Numerous other techniques for identifying the receiving vehicle 106 are contemplated and are within the scope of the present disclosure.

In some implementations, the UAV 108 may identify the receiving vehicle 106 based on one or more readily identifiable characteristics of the receiving vehicle 106. For example, the UAV 108 may be configured with one or more computer vision systems to identify the receiving vehicle 106 by a license plate number (or any other passive vehicle identifier). Additionally or alternatively, the UAV 108 may receive actively generated signals from the client computing device 104 to enable the receiving vehicle 106 to be identified. For example, the client computing device 104 may be a smart phone that is equipped with one or more GPS components to generate location data indicating a real-time location of the client computing device 104. Then, the client computing device 104 may actively transmit this location data to the UAV 108 to enable the UAV 108 to locate and identify the receiving vehicle 106 within the rendezvous area 114. Additionally or alternatively, the UAV 108 may identify the receiving vehicle 106 based on one or more actively generated visual signals. For example, the receiving vehicle 106 can emit a series of quick emissions of light (e.g., from headlights and/or taillights and/or hazard lights) that the UAV 108 is able to recognize to identify the receiving vehicle 106. As a more specific but nonlimiting example, as the UAV 108 enters the rendezvous area 114, one or more components of the system 100 (e.g., the UAV 108 and/or the en route delivery flight planner 102) may transmit instructions to the receiving vehicle 106 to cause the receiving vehicle 106 to emit an identification signal such as, for example, a predetermined light flashing pattern. For example, the system 100 may cause the receiving vehicle 106 to flash its brake lights ten times with each flash being 0.25 seconds long with 0.5 seconds in between each flash. Then, the UAV 108 may identify the receiving vehicle 106 as the particular vehicle among many other vehicles within the rendezvous area 114 that is emitting the predetermined light flashing pattern. For example, the UAV 108 may have six total vehicles within its viewable area (e.g., viewable by computer vision cameras of the UAV 108) with only the receiving vehicle 106 emitting the predetermined flashing light pattern. In this way, the UAV 108 is able to identify the receiving vehicle 106 even in the absence of permanently visible identifying indicia (e.g. a license plate number, VIN, IR paint markings, etc.). Exemplary identification signals include, but are not limited to, light-based signals, radio signals, ultrasonic signals, and/or any other signal that can be actively generated by the receiving vehicle 106 and actively sensed by the UAV 108.

Once the receiving vehicle 106 is identified, the UAV 108 approaches the receiving vehicle 106 to achieve the predetermined alignment (a.k.a, the target alignment) between the product 158 and the receiving vehicle 106. For example, the UAV 108 may fly a predetermined distance above the receiving vehicle 106 while the receiving vehicle 106 is traveling along an interstate highway. Then, the UAV 108 may closely monitor a velocity and/or side-to-side steering movements of the receiving vehicle to achieve and/or maintain the predetermined alignment. Finally, the UAV 108 may facilitate a transfer of the product 158 to the receiving vehicle 106 as described elsewhere herein.

In some implementations, the en route delivery flight planner 102 may determine a product source 110 based on the anticipated travel data 126. For example, in the illustrated scenario, an occupant of the receiving vehicle 106 left his or her home 402 and shortly thereafter placed an order for a fungible good that is obtainable from either a first fulfillment center 404(1) or a second fulfillment center 404(2). Then, upon receiving the order data 156, the en route delivery flight planner 102 deploys the navigation engine 116 to generate the flight plan data 118 that defines a flight path for the UAV 108 to travel along to rendezvous with the receiving vehicle 106 along the predetermined route. In this example, because the receiving vehicle 106 was already traveling away from the first fulfillment center 404(1) at time $T_1$ when the occupant placed the order, the navigation engine 116 has determined it to be more feasible and/or efficient for the UAV 108 to be deployed from the second fulfillment center 404(2) to fulfill the order as opposed to a different UAV from the first fulfillment center 404(1). In this example, the navigation engine 116 has further determined that deployment of the UAV 108 should be delayed until the receiving vehicle 106 comes closer to the second fulfillment center 404(2). In particular, despite the order being received at time $T_1$, the flight plan data 118 causes the UAV 108 to wait until time $T_2$ before departing from the second fulfillment center 404(2) towards the rendezvous area 114.

Figure 5:
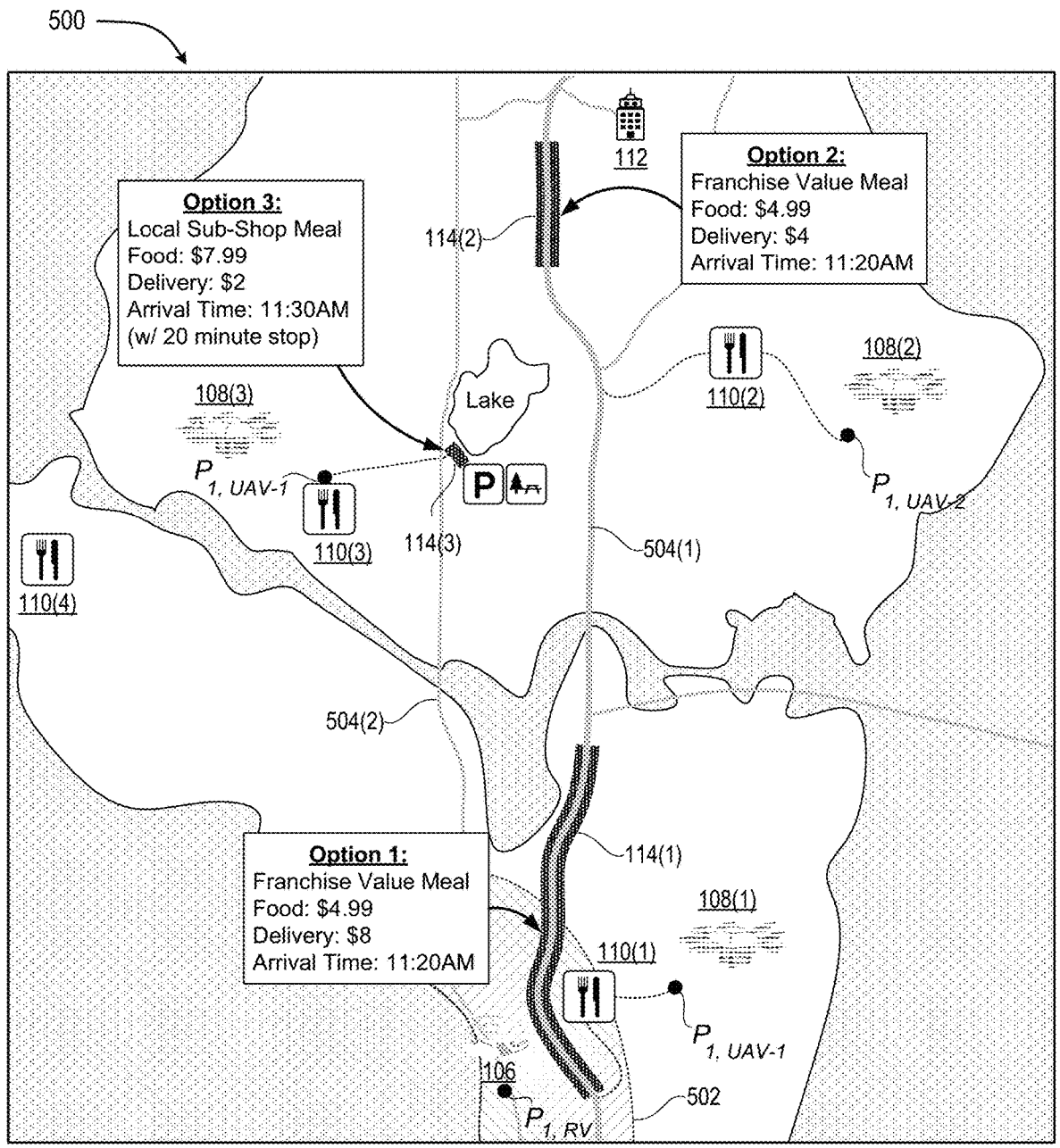
FIG. 5 illustrates various details of an area in which multiple UAVs are located and for which an en route delivery flight planner tracks locations to generate product acquisition options in response to preliminary order fulfillment data that expresses an interest in obtaining a product or a category of product.

Turning now to FIG. 5, various details are illustrated of an area 500 throughout which multiple UAVs 108 are located and for which the en route delivery flight planner 102 tracks locations and generates product-acquisition options. In particular, the area 500 includes first through third UAVs labeled 108(1) through 108(3), respectively. In the illustrated example, preliminary order data 156(P) is generated via the client computing device 104 and is transmitted to the en route delivery flight planner 102 while the receiving vehicle 106 is located at the initial-location $P_{1,\ RV}$. The preliminary order data 156(P) indicates that the user will be shortly departing from the initial-location $P_{1,\ RV}$ towards the destination-location 112 and would like to receive an en route food delivery. In some implementations, the preliminary order data 156(P) may also indicate a latest arrival time that the user can arrive at the destination-location 112. For example, the user may have a meeting scheduled at 11:45 AM at the destination-location 112 such that the preliminary order data 156(P) indicates a latest arrival time of 11:45 AM. In some implementations, the en route delivery flight planner 102 may access the calendar data 138 to identify a calendar event and, based thereon, determine the latest arrival time.

Based on the preliminary order data 156(P), the en route delivery flight planner 102 determines a plurality of product-acquisition options 160 and, ultimately, provides these product-acquisition options 160 to the client computing device 104. The user may use the client computing device 104 to compare the plurality of product-acquisition options 160 and, ultimately, to select an individual product-acquisition. Based on the user selection, the client computing device 104 transmits order data 156 to the en route delivery flight planner 102 which then prompts dispatching of a particular one of the UAVs that correspond to the selected product-acquisition option. In the illustrated example, the en route delivery flight planner 102 has determined three different product-acquisition options, each having unique characteristics as compared to the other product-acquisition options. Furthermore, in the illustrated example, the UAVs 108 are "roaming" UAVs that are not based out of (e.g., stationed at) any particular fulfillment center but rather can be dispatched to any number of product sources such as, for example, grocery stores, hardware stores, "big-box" physical retail locations (e.g., WALMART, KMART, COSTCO, SAMS CLUB, SEARS), restaurants, and/or any other source of products which can be ordered online and are suitable to be carried by a UAV.

In this example, the first product-acquisition option is for the user to receive a franchise value meal (e.g., a BIG MAC® Value Meal offered by MCDONALD'S®) within a first rendezvous area 114(1) for a total cost of $12.99 and an estimated arrival time at the destination-location 112 of 11:20 AM. In some implementations, the total cost of any particular product-acquisition option includes a delivery cost in addition to a product cost. For example, the first product-acquisition option includes a delivery cost of $8 and a product cost of $4.99. In some implementations, the delivery cost for any individual product-acquisition option may be based on factors such as a distance of a UAV from a product source, whether other orders exist such that the UAV can fulfill several deliveries within or near a rendezvous area, demand for delivery services within the vicinity of a particular UAV, etc. For example, in the illustrated example the first UAV 108(1) that corresponds to the first product-acquisition option is already located near a heavily congested metropolitan area 502 where numerous other busy business persons may also be willing to pay relatively high delivery costs for the convenience of shortening the time required to obtain lunch. Accordingly, the en route delivery flight planner 102 may consider this factor in determining the relatively high delivery cost of the first product-acquisition option as compared to the other two product-acquisition options. In some examples, the delivery cost for a particular product acquisition option may be zero, e.g., the delivery cost could be free delivery.

In some implementations, the en route delivery flight planner 102 is configured to determine one or more product-acquisition options having alternate routes and transmit the route data 120 to the client computing device 104 within the product-acquisition options 160. For example, as illustrated, both the first and second product-acquisition options have rendezvous areas (labeled 114(1) and 114(2), respectively) along a first public roadway 504(1) whereas the third product-acquisition option has a rendezvous area 114(3) at a public parking lot (indicated by the "P" symbol) of a public park (indicated by the picnic table symbol) that is located off a second public roadway 504(2). As illustrated, the third product-acquisition option includes a rendezvous with the third UAV 108(3) at the public parking lot to accept a delivery of a local sub shop meal that is offered by a third product source 110(3). In various implementations, the en route delivery flight planner 102 may select a threshold number of product-acquisition options that will yield the most income to a business that is operating the en route delivery flight planner 102. Then, the selected product-acquisition options may be displayed more prominently on the client computing device 104 to encourage a selection of these options.

In some implementations, the en route delivery flight planner 102 is configured to determine whether the user can receive a stationary delivery (e.g., by pulling into a parking lot or pulling onto the shoulder of a road) of the product while en route to the destination-location 112 without arriving later than the predetermined latest arrival time (e.g., a time indicated in the preliminary order data 156(P) and/or determined based on the calendar data 138). For example, in FIG. 5 the en route delivery flight planner 102 has determined that the third product-acquisition option would permit a 20-minute stop at the public park during which the user could accept delivery of and even consume the local sub shop meal and still arrive at the destination-location prior to the predetermined latest arrival time. Thus, in some implementations the en route delivery flight planner 102 may be configured to identify and suggest product-acquisition options that permit users to take "breaks" from their professional responsibilities without negatively impacting their punctuality and/or productivity.

In various implementations, the en route delivery flight planner 102 is configured to select one or more individual product sources 110 to obtain the product 158 based on a location of the individual product sources 110 with respect to the predetermined route and/or the flight path. For example, as illustrated in FIG. 5 a fourth product source 110(4) also exists from which the product 158 could potentially be obtained and delivered to the receiving vehicle 106. As further illustrated, the en route delivery flight planner 102 has elected not to provide a product-acquisition option 160 that corresponds to the fourth product source 110(4). As shown, the fourth product source 110(4) is located relatively farther away from the illustrated route options (e.g., along the first public roadway 504(1) and the second public roadway 504(2)). Therefore, in order to source the product 158 from the fourth product source 110(4), a UAV 108 would have to travel a great distance away from the potential routes such that this option would be inefficient as compared to the other three product-acquisition options discussed in FIG. 5. Thus, in various implementations, the techniques described herein include selecting individual UAVs 108 in conjunction with individual product sources 110 based on a relative location of the individual UAVs 108 with respect to the individual product sources 110 and/or a relative location of the individual product sources 110 with respect to the potential and/or suggested route(s) that the receiving vehicle 106 is expected to travel.

In various implementations, the en route delivery flight planner 102 is configured to select one or more individual UAVs 108 to obtain the product 158 based on specific capabilities of the individual UAVs 108. For example, the en route delivery flight planner 102 may identify a current energy reserve level (e.g., a current battery level and/or fuel level), a current mileage range (e.g., a distance that can be traveled before depleting energy reserves), a maximum load (e.g., a maximum weight the UAV can carry) of the individual UAVs 108. Then, individual UAVs 108 may be selected to fulfill various orders based on their specific capabilities. For example, an individual UAV 108 that has only a current mileage range of twenty-five miles may not be selected to fulfill an order that will require a UAV 108 to travel fifty miles.

Figure 6:
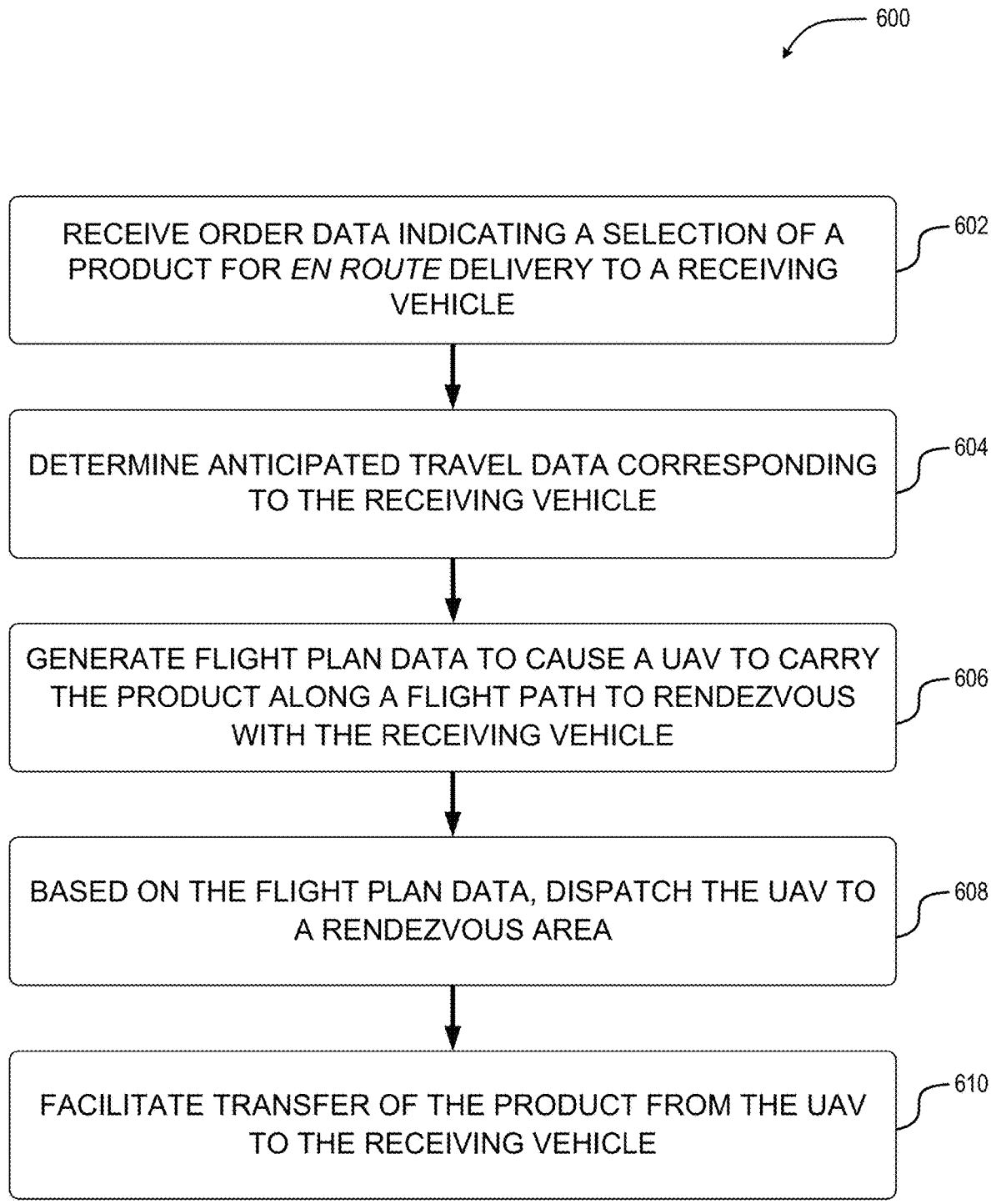
FIG. 6 is a flow diagram of a process to generate flight plan data for the system to cause the UAV to fly along an at least partially predetermined flight path to rendezvous with the receiving vehicle.

Turning now to FIG. 6, a flow diagram is illustrated of a process 600 to generate flight plan data for a UAV 108 to cause the UAV 108 to fly along an at least partially predetermined flight path to rendezvous with a receiving vehicle 106. The process 600 is described with reference to FIGS. 1-5. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 602, a system may receive order data 156 that indicates a selection of a product 158 for delivery to a receiving vehicle 106 that is en route to a destination-location 112. Exemplary receiving vehicles include, but are not limited to, road-based vehicles such as cars and/or trucks that are configured to operate on a roadway system, track-based vehicles such as trains that are configured to operate on a railway system, outdoor water-based vehicles such as fishing boats and/or cargo vessels that are configured to navigate through waterways. As used herein, the term "roadway system" refers generally to any system of interconnected roads that are configured for vehicle travel such as a delivery vehicle and a receiving vehicle which may travel along one or more of the interconnected roads. Exemplary roadway systems include, but are not limited to, systems of privately funded roadways (e.g., road systems and business campuses), and publicly funded roadways such as, for example, highways, interstates, arterials, and residential streets. Accordingly, the delivery may be performed for a receiving vehicle that is en route to a destination on a publicly funded highway to cross a city and/or a privately funded campus roadway (e.g., a roadway on GOOGLE'S business campus in Mountain View, Calif., and/or MICROSOFT'S business campus in Redmond, Wash.). As used herein, the term "railway system" refers generally to any system of interconnected tracks or rails along which one or more vehicles are configured to operate.

At block 604, the system may determine anticipated travel data 126 corresponding to the receiving vehicle 106. In some implementations, the anticipated travel data may be included, in whole or in part, with the order data 156. For example, determining the anticipated travel data 126 at block 604 may comprise parsing the anticipated travel data from the order data received at block 602. In some implementations, the anticipated travel data 126 may be generated by the system based on the order data 156 received at block 604, user data 132 received from a client computing device 104, and/or directly from a navigation module 142 corresponding to the receiving vehicle 106 and/or a client computing device 104. Additionally, order data can be automatically generated based on activity of a computer user. Such activity can include, but is not limited to, order history activity, consumption activity, etc. Recurring or automatic orders can be generated and dynamically adjusted based on order history activity, consumption activity, etc. For illustrative purposes, order data can be obtained which can mean it can be received from a computer initiating an order or it can mean order data can be generated, which may be from a system generating recurring or automatic orders.

In some implementations, the anticipated travel data 126 indicates a predetermined route that the receiving vehicle is expected to navigate along to arrive at a destination-location 112. Stated alternatively, the anticipated travel data 126 may indicate an expected path (e.g., along a series of predetermined roads, along a predetermined stretch of a rail track, and/or along a body of water at a predetermined heading) that the receiving vehicle 106 will traverse to arrive at the destination-location 112. In some implementations, the anticipated travel data 126 further indicates a travel-schedule that defines time-based expectations of when the receiving vehicle will reach various points along the first route.

In some implementations, determining the anticipated travel data 126 may include determining route-deviation data associated with causing the receiving vehicle to deviate from a direct route between an initial-location of the receiving vehicle and the destination-location. For example, the system may determine a plurality of rendezvous areas along a plurality of different routes that the receiving vehicle 106 could potentially take from the initial-location to the destination-location 112. Then, the system may transmit data to enable a consumer to select between a plurality of different product-acquisition options. For example, the consumer may be provided with a first option to receive the en route delivery on a most direct route between the initial-location and the destination-location for a first delivery cost in addition to a second option to receive the en route delivery on a slightly less direct route for a second delivery cost that is less than the first cost. The route deviation data may indicate how deviation from the most direct route will impact an estimated time of arrival at the destination-location as well as varying the delivery costs associated with receiving delivery at different rendezvous areas along the different routes.

At block 606, the system may generate flight plan data to cause the UAV to rendezvous with the receiving vehicle along the predetermined route while the UAV is carrying the product within the cargo release equipment. Generating the flight plan data may be responsive to receiving the order data 156. In some implementations, the flight plan data may indicate a flight path for the UAV to take to the rendezvous area 112 and/or a flight-schedule for the UAV to fly along the flight path. Since the receiving vehicle 106 is expected to be traveling along the predetermined route during the en route delivery, it can be appreciated that the flight may, at least partially, define the rendezvous area along a portion of the predetermined route that is common to the flight path. Stated alternatively, the rendezvous area may be defined by the combination of the travel-schedule which indicates when the receiving vehicle will be at various points along the predetermined route and the flight plan data which indicates when the UAV will be at various points along the flight path.

In some implementations, the flight plan data may be generated based on one or more aspects of the user data 132. For example, the flight path and/or the flight-schedule may be determined based on a status of a consumer corresponding to the order data 156 such as, for example, whether the consumer is a preferred member associated with the en route delivery flight planner 102. As another example, the flight plan data and/or the flight-schedule may be determined based on a rank of the consumer corresponding to the order data within an organizational and/or governmental hierarchy (e.g., the flight plan data may be generated to prioritize deliveries to high-ranking individuals). As another example, the flight plan data and or the flight-schedule may be determined based on a payment system to enable consumers to bid for prioritized delivery (e.g., consumers that are willing to pay more for delivery may have their deliveries prioritized). In some implementations, the flight plan data may be generated to limit potential rendezvous areas based on a consumer's willingness to pay for delivery. For example, a consumer that is willing to pay a relatively high amount for delivery may be provided with the option to select the rendezvous area within the congested metropolitan area 502 whereas another consumer that is willing to pay a relatively low amount for delivery may be provided with options to select rendezvous areas on the outside of the congested metropolitan area 502.

In some implementations, a particular rendezvous area may be selected based on an environmental impact of the receiving vehicle. For example, a fully electric receiving vehicle may be permitted to rendezvous within a public park whereas a heavy diesel receiving vehicle may be restricted from rendezvous within the public park.

At block 608, the UAV may be dispatched from an initial-location along the flight path to the rendezvous area so that the UAV will arrive within the rendezvous area substantially concurrently with the receiving vehicle arriving within the rendezvous area. For example, the UAV may be caused to arrive five minutes before the receiving vehicle, three minutes before the receiving vehicle, one minute before the receiving vehicle, exactly when the receiving vehicle arrives, one minute after the receiving vehicle, three minutes after the receiving vehicle, five minutes after the receiving vehicle, and/or any other suitable period of time before or after the receiving vehicle arrives within the rendezvous area. As described elsewhere herein, dispatching the UAV from the initial-location to the rendezvous area may include first dispatching the UAV along a first segment of the flight path to a product source and then subsequently dispatching the UAV along a second segment of the flight path to the rendezvous area. In some implementations, however, the UAV may be dispatched from the initial-location directly to the rendezvous area to deliver the product. For example, the UAV may be dispatched directly from a fulfillment center that stocks the product for an online retailer.

In some implementations, the UAV may be preloaded with the product (or a plurality of different products for that matter) and may be ready to be dispatched directly to the receiving vehicle upon receiving the order. As a more specific but nonlimiting example, the UAV may be preloaded with a variety of different refreshments (e.g., sodas, candy bars, healthy snacks, bottled waters, sandwiches, etc.) and/or convenience items (e.g., Toiletries, Chapstick, deodorant, batteries, phone chargers, dress shirts, etc.), and/or any other type of item suitable for an en route delivery and that is light enough to be carried by the UAV along the flight path. In one example, the UAV is configured to physically alter the product from a first material-form to a second material-form by performing one or more operations to one or more components of the product. In some implementations, the UAV may be configured to perform an assembly operation to physically combine one or more components of the product. As a more specific but nonlimiting example, the UAV may be configured to combine a coffee ground component and a hot-water component to brew a fresh cup of coffee (i.e., the product) while hovering above the receiving vehicle. Furthermore, in some implementations the UAV may physically land on top of the receiving vehicle and slowly deploy a robotic arm through a sunroof of the receiving vehicle and/or hover adjacent to a side window of the receiving vehicle to prevent spillage of the hot beverage. In some cases, the delivery transaction might have to be aborted. In such scenarios, the robotic arm holding the product can be retracted. The UAV can try to reposition by the use of one or more maneuvers to reattempt a delivery. In some cases, the robotic arm can be detachable to allow the robotic arm to be jettisoned to avoid an accident. In such embodiments, the robotic arm can be controlled by any computing device to detach in response to any signal generated by the computing system. For instance, when two vehicles reach a threshold probability of a collision or when a person may be too close to the robotic arm, the system can cause the robotic arm to detach. In some cases, one or more vehicles might have to be sacrificed to save bystanders and passengers of any vehicle in or near the rendezvous area. Special navigation maneuvers or safety features can be installed for such scenarios.

At block 610, the UAV may be caused to approach the receiving vehicle within the rendezvous area to facilitate a transfer of the product from the UAV to the receiving vehicle. For example, the UAV may fly directly above the receiving vehicle at the target alignment and drop the product through a sunroof of the receiving vehicle, lower the product on a tether through the sunroof and/or adjacent to a side window of the receiving vehicle, and/or extend the product towards an opening of the receiving vehicle via a robotic arm.

In some implementations, the receiving vehicle 106 may serve to at least partially deliver the product 158 to another location and/or to another receiving vehicle 106. For example, upon receiving delivery of the product 158 at the receiving vehicle 106, the receiving vehicle 106 may continue along the predetermined route into a second rendezvous area at which a second UAV again performs a rendezvous with the receiving vehicle. Then, the product 158 may be transferred from the receiving vehicle to the second UAV which then continues on with the product 158 to fulfill a corresponding order. In various implementations, an owner and/or operator of the receiving vehicle 106 may be compensated based on various factors such as, for example, a size of the product, an importance of the product, a deviation from his or her most direct route, a distance that the product is carried, and/or any other relevant factor.

Figure 7:
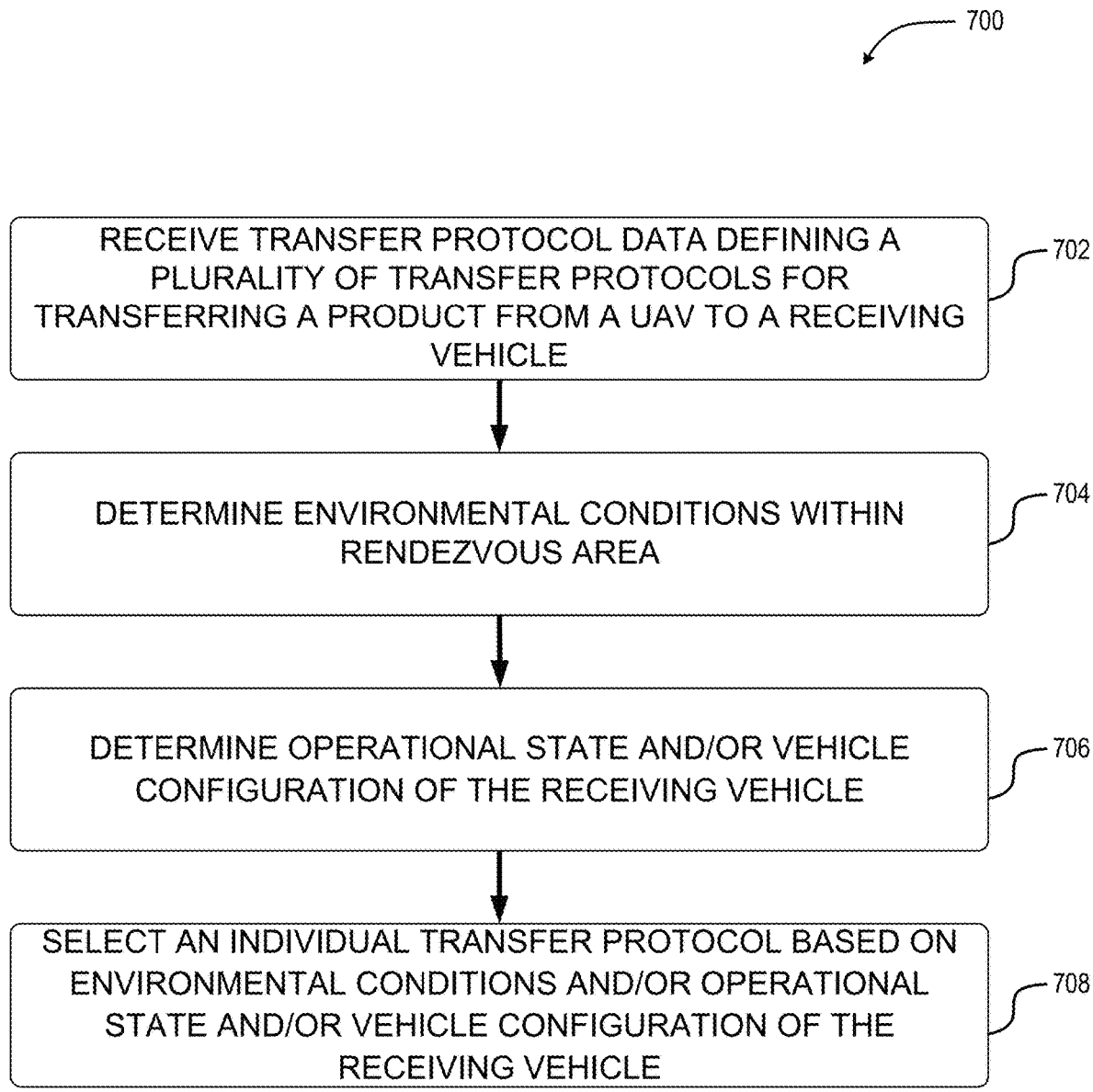
FIG. 7 is a flow diagram of a process to select an individual transfer protocol from a plurality of transfer protocols for transferring the product from the UAV to the receiving vehicle.

Turning now to FIG. 7, a flow diagram is illustrated of a process 700 to select an individual transfer protocol for transferring the product from the UAV to the receiving vehicle.

At block 702, transfer protocol data is received that defines a plurality of transfer protocols for transferring the product from the UAV to the receiving vehicle. As used herein, the term "transfer protocol" refers generally to any predefined procedure (and associated computer executable instructions for carrying out the predefined procedure) that defines a particular manner in which the UAV is to transfer possession of the product to the receiving vehicle and/or an occupant of the receiving vehicle. Exemplary transfer protocols may include, but are not limited to, dropping the product through an open sunroof, dropping the product into a bed of a pickup truck, dropping the product into an interior region of a convertible vehicle (e.g., when the convertible top is down), setting the product down next to a receiving vehicle that is parked, suspending the product adjacent to a side opening of the receiving vehicle to enable an occupant of the receiving vehicle to retrieve the product, following the receiving vehicle until a velocity of the receiving vehicle falls below a threshold velocity, and/or transmitting instructions to the receiving vehicle to cause an autopilot module and/or a driver of the receiving vehicle to pull the receiving vehicle onto a shoulder of a highway.

At block 704, environmental conditions within the rendezvous area are determined. Exemplary environmental conditions include, but are not limited to, precipitation conditions (e.g., whether it is raining, snowing, hailing, or clear), ambient air temperature conditions, wind conditions, air density conditions, conditions for a road that the receiving vehicle is driving on (e.g., whether the road is smooth or bumpy, whether the road is straight or winding, whether the road has overpasses and/or tunnels that may impact the UAVs ability to fly over and track the receiving vehicle, etc.), and/or any other environmental condition that may impact an ability of the UAV to safely and efficiently transfer the product to the receiving vehicle and/or a user's preference for one transfer protocol over another (e.g., a user may prefer not to open his or her sunroof in rainy weather even though the UAV may be able to safely and efficiently transfer the product through the sunroof).

At block 706, an operational state and/or vehicle configuration of the receiving vehicle are determined. Exemplary operational states of the receiving vehicle include, but are not limited to, a velocity of the receiving vehicle, a current autonomy level of the receiving vehicle (e.g., a degree to which the receiving vehicle is being controlled by an autopilot module rather than a human operator), and/or whether the receiving vehicle is driving on a straightaway versus a winding road. Exemplary vehicle configurations include, but are not limited to, whether the receiving vehicle is equipped with an autopilot module, whether the receiving vehicle includes a roof opening such as a convertible top and/or sunroof, and/or whether the receiving vehicle has a dedicated cargo area such as a bed of a pickup truck.

At block 708, an individual transfer protocol may be selected from the plurality of transfer protocols based on at least one of the environmental conditions within the rendezvous area, operational state of the receiving vehicle, or the vehicle configuration of the receiving vehicle.

In some implementations, the individual transfer protocol may be selected based on a current autonomy level of the receiving vehicle. For example, the UAV may approach the receiving vehicle within the rendezvous area and determine whether the receiving vehicle is operating autonomously or whether the receiving vehicle is being manually driven by a human operator. In some examples, the UAV may establish a communications Link with the receiving vehicle to determine whether the receiving vehicle is equipped with an autopilot module. Then, if the receiving vehicle is not currently under the autopilot module's control, the UAV may instruct the autopilot module to take control of the receiving vehicle for the duration of the en route product delivery. In this way, the UAV may deliver the product while both the receiving vehicle and the UAV are in motion but without any distraction caused to an occupant of the receiving vehicle which might impact driving safety.

In some examples, the UAV may monitor movements of the receiving vehicle to determine whether the receiving vehicle is currently under the control of an autopilot module. For example, a human operator is likely to exhibit small and frequent course deviations even while traveling within a single lane on a straight stretch of the highway, whereas an autopilot module will maintain a straighter track on the highway. Accordingly, the UAV may infer the current autonomy level of the receiving vehicle based on movements of the receiving vehicle that are monitored by the at least one sensor 204. In some examples, the UAV may determine that the receiving vehicle is either not equipped with an autopilot module and/or is not currently being controlled by the autopilot module. Then, the UAV may transmit an instruction to the receiving vehicle and/or client computing device that causes the receiving vehicle to change from a first operational state (e.g., driving at a first velocity, being driven manually, etc.) to a second operational state (e.g., driving at a second velocity that is less than the first velocity (e.g., slowing from sixty miles per hour on a lane on an interstate highway to zero miles per hour on an off ramp and/or shoulder). As a more specific but nonlimiting example, the UAV may approach the receiving vehicle within the rendezvous area and may monitor movements of the receiving vehicle using the at least one sensor 204. Then, based on a determination that the receiving vehicle is not under the control of an autopilot module, the UAV may transmit an instruction to the receiving vehicle that causes a speaker of the receiving vehicle to audibly inform a driver (and/or causes a graphical user interface to display the instruction to the driver) of the receiving vehicle that his or her order has arrived and furthermore to pull to the side of the road to initiate the transfer protocol. In some implementations, the UAV may determine whether a driver has reasonably complied with the instructions provided (e.g., based on whether the driver pulled off at the next available opportunity). Then, if the driver fails to reasonably comply with the instructions, the delivery may be aborted and/or the drivers account may be charged a fee. In some examples, the UAV may determine that the receiving vehicle is equipped with autopilot that is not currently active. In such embodiments, an instruction (e.g., an audible instruction, a visible instruction, etc.) may be transmitted to the receiving vehicle to instruct a human operator to activate the autopilot so that an in-motion delivery can be performed.

In some implementations, the individual transfer protocol may be selected from the plurality of transfer protocols based on vehicle configuration data that indicates whether the receiving vehicle is configured with a roof-opening that is suitable to transfer the product through. For example, the UAV may approach the receiving vehicle within the rendezvous area and analyze data from the at least one sensor 204 to determine whether the receiving vehicle has a sunroof that is open and/or a convertible top that is down. Then, based on a determination that the receiving vehicle is configured with a suitable roof-opening, the UAV may select a transfer protocol corresponding to lowering the product through the roof-opening on a tether, dropping the product through the roof opening along a trajectory, or otherwise passing the product through the roof-opening.

In some implementations, a transfer protocol may include causing the UAV to dynamically update its flight path to follow the receiving vehicle while a velocity of the receiving vehicle is above a threshold velocity. For example, the UAV may approach the receiving vehicle within the rendezvous area while the receiving vehicle is traveling at a high velocity (e.g., greater than sixty miles per hour, greater than fifty miles per hour, greater than forty miles per hour, etc.) and may follow the receiving vehicle until such time as the receiving vehicle's velocity decreases to at least a threshold velocity (e.g., less than thirty miles per hour, less than twenty miles per hour, less than ten miles per hour, or a complete stop). Then, responsive to the velocity of the receiving vehicle decreasing to the threshold velocity, the UAV may begin to transfer the product to the receiving vehicle. As a more specific but nonlimiting example, the UAV may be configured to support dual flight modes wherein the first flight mode corresponds to fixed wing flight during which one or more fixed airfoils generates lift and the second flight mode corresponds to Rotary flight during which one or more rotating airfoils generates lift. In such a scenario, the UAV may be configured to follow the receiving vehicle while traveling above the threshold velocity within the first flight mode, as fixed wing flight is generally more energy efficient than Rotary flight for long-distance travel. Then, once the receiving vehicle decreases its velocity to below the threshold velocity, the UAV may transition from the first flight mode to the second flight mode to hover above the receiving vehicle to complete the en route delivery.

In some implementations, a transfer protocol may include monitoring a special relation of the UAV with respect to the receiving vehicle and, ultimately, in response to the special relation reaching a threshold special relation causing a change to an operational state of the receiving vehicle. For example, a distance between the UAV and the receiving vehicle may be monitored while the UAV flies along the flight path and while the receiving vehicle travels along the predetermined route. Then, based on the distance between the UAV and the receiving vehicle decreasing to a threshold distance, an instruction may be transmitted to the receiving vehicle and/or the client computing device that corresponds to changing the operational state of the receiving vehicle. As a more specific but nonlimiting example, a consumer that is an occupant of a non-autonomous receiving vehicle may place an order for a product using a product acquisition application on a smart phone. Then, the receiving vehicle may travel along the predetermined route toward the destination-location while the UAV flies along a flight path that is designed to intercept the receiving vehicle. The distance between the UAV and the receiving vehicle may be monitored and then when the UAV is within the threshold distance from the receiving vehicle (e.g., one-quarter mile, five hundred feet, one-hundred-feet, etc.) an instruction may be transmitted to the receiving vehicle and/or the client computing device that instructs a driver of the receiving vehicle to temporarily pull the vehicle over so that the en route product delivery can be completed. In one exemplary implementation, the client computing device (e.g., a smart phone in this immediate example) may be caused to audibly state "Your order has arrived and the delivery vehicle is flying overhead. Please pull over at your earliest convenience so that we may deliver your product." It can be appreciated that the foregoing example is for illustrative purposes only and is not to be construed as a limitation of the inventive concept described herein. For example, the client computing device could also instruct the driver to turn on an autopilot functionality of the receiving vehicle so that an in-motion delivery can be performed.

In some implementations, a transfer protocol may include transmitting an instruction to the receiving vehicle to cause the receiving vehicle to expose the opening (e.g., to roll down a side window, open a sunroof, open a convertible top, etc.). For example, the UAV may be configured to monitor a location of the receiving vehicle while the receiving vehicle is en route to the destination-location or even once the receiving vehicle has already reached and has parked at its destination-location. Then, the UAV may approach the receiving vehicle, transmit an instruction that causes the receiving vehicle to open a sunroof, transfer the product through the sunroof into the receiving vehicle, transmit a second instruction that causes the receiving vehicle to close the sunroof, and then fly away. It can be appreciated that according to these techniques the UAV may be configured to deliver a product to a receiving vehicle regardless of whether an occupant is present within the receiving vehicle. For example, an intended recipient may be driving across his or her home state while the UAV is carrying the product towards the receiving vehicle. Then, the intended recipient may stop for a restroom break and/or to have a meal and, therefore, may park and leave the receiving vehicle. Under these circumstances, the UAV may be configured to approach the receiving vehicle even in the absence of the intended recipient and completely fulfill the order prior to the intended recipient returning to the receiving vehicle.

Figure 8:
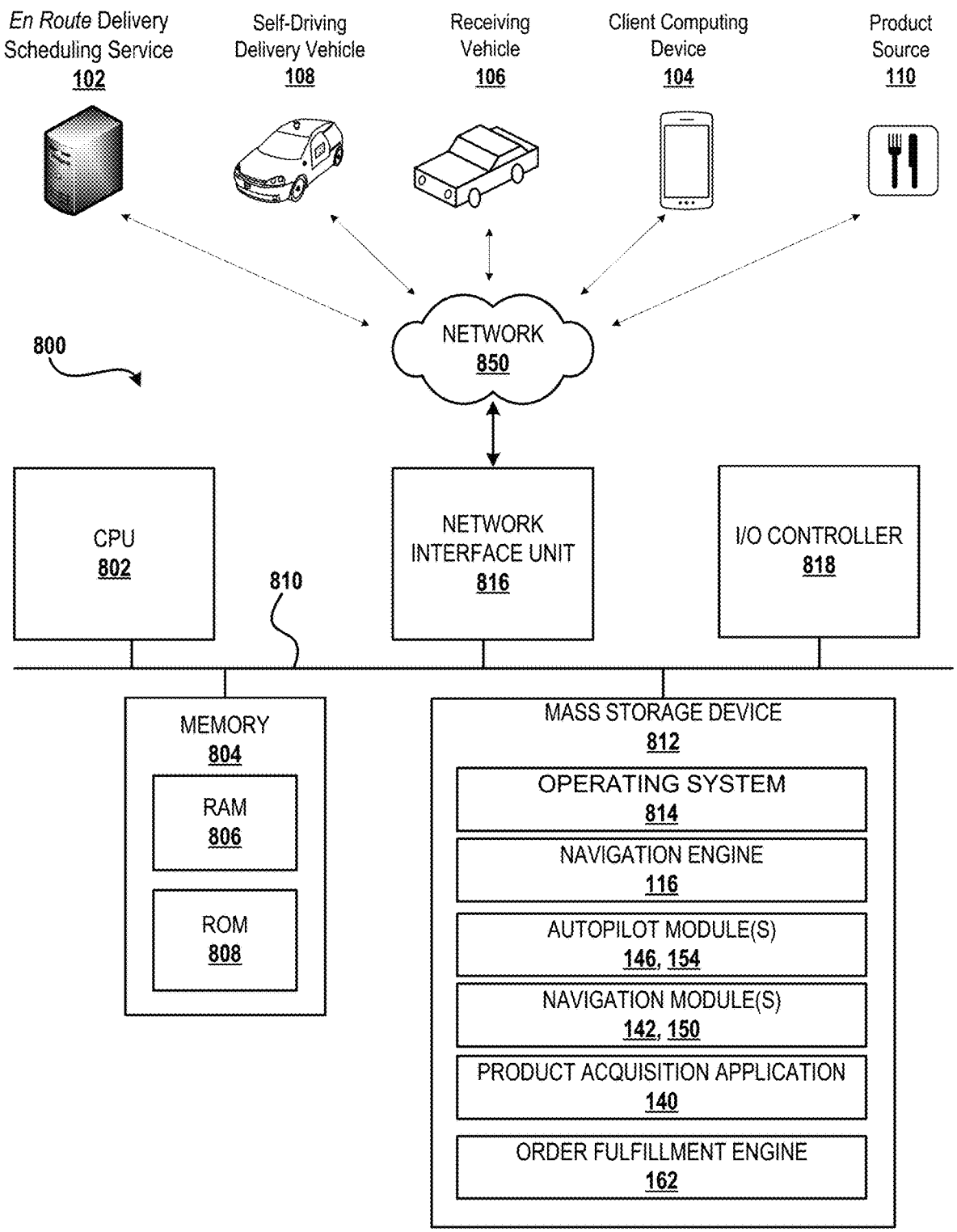
FIG. 8 shows an example computer architecture for a computer capable of executing an en route delivery flight planner as described herein.

FIG. 8 shows additional details of an example computer architecture 800 for a computer capable of executing the en route delivery flight planner 102, and/or any program components thereof as described herein. Thus, the computer architecture 800 illustrated in FIG. 8 illustrates an architecture for a server computer, or network of server computers, or any other types of computing devices suitable for implementing the functionality described herein. The computer architecture 800 may be utilized to execute any aspects of the software components presented herein.

The computer architecture 800) illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814, other data, and one or more application programs. According to further embodiments, the operating system 814 may comprise the UNIX, ANDROID, WINDOWS PHONE, MacOS, or iOS operating systems, available from their respective manufacturers. The mass storage device 812 may further include one or more of the navigation engines 116, one or both of the autopilot modules 146 and 154, one or both of the navigation modules 142 and 150, the product acquisition application 140, and/or the order fulfillment engine 162.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology. CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium" and variations thereof, does not include waves, signals, and/or other transitory and/or intangible communication media, per se.

According to various techniques, the computer architecture 800 may operate in a networked environment using logical connections to remote computers through a network 850 and/or another network (not shown). The computer architecture 800 may connect to the network 850 through a network interface unit 816 connected to the bus 810. It should be appreciated that the network interface unit 816 also may be utilized to connect to other types of networks and remote computer systems. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8). It should also be appreciated that via a connection to the network 850 through a network interface unit 816, the computing architecture may enable the en route delivery flight planner 102 to communicate with one or more of the self-driving delivery vehicle 108, the receiving vehicle 106, the client computing device 104, and/or the product source 110. For illustrative purposes the self-driving delivery vehicle 108 is also referred to herein as a "delivery vehicle" or a "UAV."

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all the components shown in FIG. 8, may include other components that are not explicitly shown in FIG. 8, or may utilize an architecture completely different than that shown in FIG. 8.

Although the examples disclosed herein utilize graphical user interfaces for display screens, it can be appreciated that data described herein can be communicated to a user by any type of communication. For instance, a voice command can be generated over a speaker system, projection devices can be used, etc. It can be appreciated that any type of data can be communicated to a user using any suitable delivery mechanism.

EXAMPLE CLAUSES

The disclosure presented herein may be considered in view of the following clauses.

Example Clause A, a method, comprising: obtaining order data indicating a selection of a product for delivery by an unmanned aerial vehicle (UAV) to a receiving vehicle; determining anticipated travel data corresponding to the receiving vehicle; generating, based on the anticipated travel data, flight plan data that at least partially defines a flight path for the UAV from an initial-location to a rendezvous area for transferring the product from the UAV to the receiving vehicle; releasably coupling the product to the UAV; dispatching the UAV in accordance with the flight plan data to cause the UAV to travel along the flight path from the initial-location to the rendezvous area; causing the UAV to maintain a synchronized velocity between the UAV and the receiving vehicle within the rendezvous area; and causing the UAV to transfer the product through an opening of the receiving vehicle while maintaining the synchronized velocity.

Example Clause B, the method of Example Clause A, further comprising: causing the UAV to adjust an alignment between the product and the opening of the receiving vehicle; and in response to a determination that the alignment has reached a predetermined alignment, causing the UAV to release the product to cause the product to pass through the opening of the receiving vehicle.

Example Clause C, the method of any one of Example Clauses A through B, wherein the causing of the UAV to release the product is further responsive to a determination that the UAV is within a predetermined vertical distance from the receiving vehicle.

Example Clause D, the method of any one of Example Clauses A through C, wherein the causing of the UAV to transfer the product through the opening includes: causing the UAV to deploy a tether to controllably lower the product towards the opening; and causing the UAV to release the product in response to a determination that the product has passed through the opening into an interior region of the receiving vehicle.

Example Clause E, the method of any one of Example Clauses A through D further comprising identifying the receiving vehicle within the rendezvous area based on at least one vehicle identifier of the receiving vehicle.

Example Clause F, the method of any one of Example Clauses A through E, wherein the identifying of the receiving vehicle comprises: causing the receiving vehicle to emit an identification signal while located within the rendezvous area; and identifying an individual vehicle, of a plurality of vehicles within the rendezvous area, as the receiving vehicle based on the individual vehicle emitting the identification signal.

Example Clause G, the method of any one of Example Clauses A through F, further comprising: determining a current autonomy level of the receiving vehicle, wherein the current autonomy level indicates a degree of control that an autopilot module is currently exhibiting over movements of the receiving vehicle; and selecting an individual transfer protocol, from a plurality of transfer protocols for transferring the product through the opening, based on the current autonomy level of the receiving vehicle.

Example Clause H, the method of any one of Example Clauses A through G, further comprising dynamically updating the flight path to cause the UAV to follow the receiving vehicle while a velocity of the receiving vehicle is above a threshold velocity, wherein the causing of the UAV to transfer the product through the opening is responsive to the velocity of the receiving vehicle decreasing to the threshold velocity.

While Example Clauses A through H are described above with respect to a method, it is understood in the context of this document that the subject matter of Example Clauses A through H can also be implemented by a device, by a system, and/or via computer-readable storage media.

Example Clause I, a system comprising: at least one processor; and at least one computer storage media storing instructions that are executable by the at least one processor to: obtain order data indicating a selection of a product for delivery by an unmanned aerial vehicle (UAV) to a receiving vehicle; determine anticipated travel data that indicates a travel-schedule that the receiving vehicle is expected to travel along a predetermined route; generate, based on the anticipated travel data, flight plan data that at least partially defines a flight path for the UAV to travel from an initial-location to a rendezvous area along the predetermined route; generate dispatch data causing the UAV to travel along at least a portion of the flight path from the initial-location to the rendezvous area while the product is releasably coupled to cargo release equipment of the UAV; determine at least one vehicle identifier to enable identification of the receiving vehicle within the rendezvous area and cause the UAV to transfer the product to the receiving vehicle in accordance with a transfer protocol in response to identifying the receiving vehicle based on the at least one vehicle identifier.

Example Clause J, the system of Example Clause I, wherein the instructions are further executable by the at least one processor to: determine vehicle configuration data that at least partially indicates a configuration of the receiving vehicle; and select, based on the vehicle configuration data, the transfer protocol from a plurality of transfer protocols for transferring the product from the UAV to the receiving vehicle.

Example Clause K, the system of any one of Example Clauses I through J, wherein the transfer protocol is selected based on the vehicle configuration data indicating that the receiving vehicle is configured with a roof-opening, and wherein the transfer protocol is associated with at least one of releasing the product at a predetermined vertical alignment with respect to the roof-opening, or deploying a tether to controllably lower the product through the roof-opening.

Example Clause L, the system of any one of Example Clauses I through K, wherein the instructions are further executable by the at least one processor to: determine operational state data that at least partially indicates a current operational state of the receiving vehicle; and cause the UAV to travel along a holding pattern with respect to the receiving vehicle while the current operational state corresponds to a first operational state, wherein the causing of the UAV to transfer the product in accordance with the transfer protocol is further responsive to the current operational state changing from the first operational state to a second operational state.

Example Clause M, the system of any one of Example Clauses I through L, wherein the instructions are further executable by the at least one processor to: monitor a spatial relation of the UAV with respect to the receiving vehicle; and in response to the spatial relation reaching a threshold spatial relation, transmit an instruction to the receiving vehicle to cause the current operational state of the receiving vehicle to change from the first operational state to the second operational state.

Example Clause N, the system of any one of Example Clauses I through M, wherein causing the UAV to transfer the product to the receiving vehicle includes causing the UAV to deploy a tether to controllably lower the product towards the opening.

Example Clause O, the system of any one of Example Clauses I through N, wherein the instructions are further executable by the at least one processor to: determine one or more substantially real-time locations of the receiving vehicle; generate, based on the one or more substantially real-time locations, projected location data that indicates one or more expected future locations of the receiving vehicle; and generate, based on the projected location data, updated flight plan data that at least partially defines an updated flightpath for the UAV to travel to rendezvous with the receiving vehicle.

While Example Clauses I through O are described above with respect to a system, it is understood in the context of this document that the subject matter of Example Clauses I through O can also be implemented by a device, via a computer-implemented method, and/or via computer-readable storage media.

Example Clause P, a method comprising: obtaining order data indicating a selection of a product for delivery by an unmanned aerial vehicle (UAV) to a receiving vehicle, wherein the UAV includes at least one sensor to generate physical characteristic data indicating one or more physical characteristics of the receiving vehicle; determining anticipated travel data corresponding to at least one of the receiving vehicle or a client device that is associated with the order data, wherein the anticipated travel data indicates a travel-schedule that the receiving vehicle is expected to travel along a predetermined route; determining at least one vehicle identifier to enable the UAV to identify the receiving vehicle within the rendezvous area; dispatching the UAV in accordance with flight plan data, that is based on the anticipated travel data, to cause the UAV to travel along a flight path from an initial-location to a rendezvous area; and causing the UAV to transfer the product to the receiving vehicle in accordance with a transfer protocol that includes at least: monitoring the physical characteristic data to adjust an alignment between the product and an opening of the receiving vehicle; and in response to a determination that the alignment has reached a predetermined alignment, releasing the product to facilitate a transfer of the product through the opening.

Example Clause Q, the method of Example Clause P, wherein the at least one vehicle identifier corresponds to an emission of a predetermined signal from the receiving vehicle by the client device that is associated with the order data.

Example Clause R, the method of any one of Example Clauses P through Q, further comprising transmitting an instruction to the receiving vehicle to cause the receiving vehicle to expose the opening.

Example Clause S, the method of any one of Example Clauses P through R, further comprising transmitting to the receiving vehicle an instruction associated with reducing a velocity of the receiving vehicle.

Example Clause T, the method of any one of Example Clauses P through S, wherein the order data further indicates a source of the product, and wherein the flight plan data further causes the UAV to travel along the flightpath from the initial-location to a source-location corresponding to the source of the product.

While Example Clauses P through T are described above with respect to a method, it is understood in the context of this document that the subject matter of Example Clauses P through T can also be implemented by a device, by a system, and/or via computer-readable storage media.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system comprising:
   at least one processor; and
   at least one computer storage media storing instructions that are executable by the at least one processor to:
      determine anticipated travel data that indicates a travel-schedule that a receiving vehicle is expected to travel along a predetermined route;
      generate, based on the anticipated travel data, flight plan data that defines a flight path, for an unmanned aerial vehicle (UAV) to travel, from an initial-location to a rendezvous area along the predetermined route;
      generate dispatch data causing the UAV to travel along the flight path from the initial-location to the rendezvous area while a product is releasably coupled to cargo release equipment of the UAV;
      receive transfer protocol data that defines:
         a first transfer protocol that corresponds to a first vehicle configuration that includes a particular type of vehicle opening, and
         a second transfer protocol that corresponds to a second vehicle configuration;
      determine vehicle configuration data that indicates whether the receiving vehicle has the first vehicle configuration, that includes the particular type of vehicle opening, or the second vehicle configuration;
      select, in response to the vehicle configuration data indicating that the receiving vehicle has the first vehicle configuration, the first transfer protocol that corresponds to the first vehicle configuration;
      in response to the UAV reaching a threshold distance from the receiving vehicle, transmit a first instruction to cause the receiving vehicle to open the vehicle opening in accordance with the first transfer protocol;
      subsequent to transmitting the first instruction, cause the UAV to transfer the product into an interior region of the receiving vehicle through the vehicle opening while hovering at a particular alignment with respect to the vehicle opening; and
      transmit a second instruction to cause the receiving vehicle to close the vehicle opening in accordance with the first transfer protocol.

2. The system of claim 1, wherein the first transfer protocol is selected based on the vehicle configuration data indicating that the receiving vehicle is not configured with a roof-opening.

3. The system of claim 1, wherein the instructions are further executable by the at least one processor to:
   determine operational state data that at least partially indicates a current operational state of the receiving vehicle; and
   cause the UAV to travel along a holding pattern with respect to the receiving vehicle while the current operational state corresponds to a first operational state, wherein the causing of the UAV to transfer the product in accordance with the first transfer protocol is further responsive to the current operational state changing from the first operational state to a second operational state.

4. The system of claim 1, wherein the instructions are further executable by the at least one processor to:
monitor a spatial relation of the UAV with respect to the receiving vehicle; and
in response to the spatial relation reaching a threshold spatial relation, transmit an instruction to the receiving vehicle to cause a current operational state of the receiving vehicle to change from a first operational state to a second operational state.

5. The system of claim 1, wherein causing the UAV to transfer the product to the receiving vehicle includes causing the UAV to deploy a tether to controllably lower the product towards a roof-opening.

6. The system of claim 1, wherein the instructions are further executable by the at least one processor to:
determine one or more substantially real-time locations of the receiving vehicle;
generate, based on the one or more substantially real-time locations, projected location data that indicates one or more expected future locations of the receiving vehicle; and
generate, based on the projected location data, updated flight plan data that at least partially defines an updated flightpath for the UAV to travel to rendezvous with the receiving vehicle.

7. The system of claim 1, wherein the first transfer protocol is further selected based on the vehicle configuration data indicating that a current autonomy level of the receiving vehicle corresponds to movements of the receiving vehicle being controlled by an autopilot module.

8. The system of claim 2, wherein the first transfer protocol is associated with at least one of:
releasing the product at a predetermined vertical alignment with respect to the roof-opening, or
deploying a tether to controllably lower the product through the roof-opening.

9. The system of claim 1, wherein the first transfer protocol is selected based on the vehicle configuration data indicating the receiving vehicle is equipped with an autopilot module.

10. The system of claim 9, wherein the instructions are further executable by the at least one processor to:
cause an instruction to be transmitted to the receiving vehicle that causes the autopilot module to control movements of the receiving vehicle, and
cause the UAV to transfer the product to the receiving vehicle while the autopilot module is controlling the movements of the receiving vehicle.

11. A computer-implemented method for enabling an unmanned aerial vehicle (UAV) to perform deliveries to receiving vehicles having various different vehicle configurations, the method comprising:
determining a travel-schedule that a receiving vehicle is expected to travel along a predetermined route;
generating, based on the travel-schedule, flight plan data that at least partially defines a flight path for the UAV to travel to a rendezvous area along the predetermined route;
causing the UAV to travel along at least a portion of the flight path to the rendezvous area while a product is releasably coupled to cargo release equipment of the UAV;
receiving transfer protocol data that defines:
a first transfer protocol that defines a first manner of transferring possession, of the product, based on the receiving vehicle having a first vehicle configuration, and
a second transfer protocol that defines a second manner of transferring possession, of the product, based on the receiving vehicle having a second vehicle configuration;
determining vehicle configuration data that indicates whether the receiving vehicle has the first vehicle configuration or the second vehicle configuration;
selecting, in response to the vehicle configuration data indicating that the receiving vehicle has the first vehicle configuration, the first transfer protocol that defines the first manner of transferring possession of the product; and
causing the UAV to transfer the product to the receiving vehicle in accordance with the first transfer protocol.

12. The computer-implemented method of claim 11, wherein the first transfer protocol is selected based on the vehicle configuration data indicating that the receiving vehicle is configured with a roof-opening.

13. The computer-implemented method of claim 11, wherein the first transfer protocol is selected based on the vehicle configuration data indicating that the receiving vehicle is currently being controlled by an autopilot module.

14. The computer-implemented method of claim 11, further comprising:
transmitting an instruction to the receiving vehicle to cause a current operational state of the receiving vehicle to change from a first operational state to a second operational state, and
causing the UAV to transfer the product to the receiving vehicle in accordance with the first transfer protocol subsequent to the current operational state of the receiving vehicle changing to the second operational state.

15. The computer-implemented method of claim 11, wherein the UAV includes at least one sensor to generate physical characteristic data indicating one or more physical characteristics of the receiving vehicle, and wherein the causing the UAV to transfer the product to the receiving vehicle in accordance with the first transfer protocol includes:
monitoring the physical characteristic data to adjust an alignment between the product and an opening of the receiving vehicle; and
in response to a determination that the alignment has reached a predetermined alignment, releasing the product to facilitate a transfer of the product through the opening.

16. The computer-implemented method of claim 15, further comprising:
transmitting an instruction to the receiving vehicle to cause the receiving vehicle to expose the opening.

17. A system for facilitating delivery of a product to a receiving vehicle by an unmanned aerial vehicle (UAV), the system comprising:
at least one processor; and
at least one computer storage media storing instructions that are executable by the at least one processor to:
determine anticipated travel data that indicates a predetermined route that the receiving vehicle is expected to travel;
cause the UAV to travel to a rendezvous area along the predetermined route while the product is releasably coupled to cargo release equipment of the UAV;

based on at least one vehicle identifier, identify the receiving vehicle within the rendezvous area along the predetermined route;

receive transfer protocol data that defines:
- a first transfer protocol that corresponds to a first vehicle configuration and that defines a first manner of transferring possession of the product, and
- a second transfer protocol that corresponds to a second vehicle configuration and that defines a second manner of transferring possession of the product;

determine vehicle configuration data that indicates whether a configuration of the receiving vehicle corresponds to the first vehicle configuration or the second vehicle configuration;

select, based on the configuration of the receiving vehicle corresponding to the first vehicle configuration, the first transfer protocol that defines the first manner of transferring possession of the product; and cause the UAV to transfer the product to the receiving vehicle in accordance with the first transfer protocol.

18. The system of claim 17, wherein causing the UAV to transfer the product to the receiving vehicle in accordance with the first transfer protocol includes:
- causing the UAV to maintain a synchronized velocity between the UAV and the receiving vehicle within the rendezvous area; and
- causing the UAV to transfer the product through an opening of the receiving vehicle while maintaining the synchronized velocity.

19. The system of claim 17, wherein the instructions are further executable by the at least one processor to:
- determine whether an autopilot module is controlling movements of the receiving vehicle, and
- cause the UAV to transfer the product to the receiving vehicle while the autopilot module is controlling the movements of the receiving vehicle.

20. The system of claim 17, wherein the first transfer protocol is selected based on the vehicle configuration data indicating that the receiving vehicle is currently being controlled by an autopilot module.

* * * * *